US010718560B2

(12) United States Patent
Sul et al.

(10) Patent No.: US 10,718,560 B2
(45) Date of Patent: Jul. 21, 2020

(54) REFRIGERATOR AND CONTROL METHOD THEREOF

(71) Applicant: LG ELECTRONICS INC., Seoul (KR)

(72) Inventors: Heayoun Sul, Seoul (KR); Dongseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 540 days.

(21) Appl. No.: 15/325,813

(22) PCT Filed: Jul. 15, 2015

(86) PCT No.: PCT/KR2015/007341
§ 371 (c)(1),
(2) Date: Jan. 12, 2017

(87) PCT Pub. No.: WO2016/013798
PCT Pub. Date: Jan. 28, 2016

(65) Prior Publication Data
US 2017/0176083 A1 Jun. 22, 2017

(30) Foreign Application Priority Data

Jul. 21, 2014  (KR) .................. 10-2014-0092179
Jul. 21, 2014  (KR) .................. 10-2014-0092180
Jul. 21, 2014  (KR) .................. 10-2014-0092181

(51) Int. Cl.
*F25D 11/00* (2006.01)
*F25D 17/06* (2006.01)
(Continued)

(52) U.S. Cl.
CPC ............. *F25D 17/065* (2013.01); *F25B 5/02* (2013.01); *F25B 6/04* (2013.01); *F25D 11/006* (2013.01);
(Continued)

(58) Field of Classification Search
CPC .... F25B 5/02; F25B 6/04; F25B 40/02; F25B 6/00; F25B 2313/02731; F25D 11/006
See application file for complete search history.

(56) References Cited

U.S. PATENT DOCUMENTS 5,174,123 A * 12/1992 Erickson ................. F25B 1/047
62/113
5,689,962 A  11/1997 Rafalovich
(Continued)

FOREIGN PATENT DOCUMENTS

CN   102844635        12/2012
DE   102011006263 A1  10/2012
(Continued)

OTHER PUBLICATIONS

Office Action in Chinese Application No. 201580035428.2, dated Sep. 3, 2018, 14 pages (with English Translation).
(Continued)

Primary Examiner — David J Teitelbaum
(74) Attorney, Agent, or Firm — Fish & Richardson P.C.

(57) ABSTRACT

Disclosed are a refrigerator and a control method thereof. The refrigerator according to one aspect includes a main body having a storage chamber; a compressor configured to compress a refrigerant; a condenser configured to condense the refrigerant compressed by the compressor; an evaporation expander configured to depressurize the refrigerant condensed by the condenser; a first evaporator configured to evaporate the refrigerant depressurized by the evaporation expander and thus to cool the storage chamber; a condensing expander installed between the condenser and the evaporation expander and configured to depressurize the refrigerant condensed by the condenser; and a subsidiary condenser installed between the condensing expander and the evapo-
(Continued)

ration expander and configured to condense the refrigerant depressurized by the condensing expander.

12 Claims, 21 Drawing Sheets

(51) Int. Cl.
*F25B 5/02* (2006.01)
*F25B 6/04* (2006.01)
*F25B 40/02* (2006.01)
*F25B 6/00* (2006.01)

(52) U.S. Cl.
CPC .............. *F25B 6/00* (2013.01); *F25B 40/02* (2013.01); *F25B 2313/02731* (2013.01)

(56) References Cited

U.S. PATENT DOCUMENTS

| | | | |
|---|---|---|---|
| 7,770,405 B1* | 8/2010 | Dillon | F24F 3/153 236/44 C |
| 2014/0130536 A1* | 5/2014 | Joppolo | F25B 7/00 62/335 |

FOREIGN PATENT DOCUMENTS

| | | |
|---|---|---|
| EP | 2381193 A1 | 10/2011 |
| EP | 2511627 A1 | 10/2012 |
| JP | 2002-274165 | 9/2002 |
| JP | 2004-333092 | 11/2004 |
| JP | 2009-139000 | 6/2009 |
| JP | 2013-092291 | 5/2013 |
| JP | 2014-126350 | 7/2014 |
| KR | 20-0128886 | 8/1998 |
| KR | 10-0182726 | 12/1998 |
| KR | 10-2007-0032497 | 3/2007 |
| KR | 10-0808180 | 2/2008 |
| WO | WO2011102953 A1 | 8/2011 |
| WO | WO2014048482 A1 | 4/2014 |

OTHER PUBLICATIONS

International Search Report and Written Opinion in International Application No. PCT/KR2015/007341, dated Oct. 29, 2015, 8 pages.
Extended European Search Report in European Application No. 15824426.9, dated Feb. 26, 2018, 8 pages.

* cited by examiner

[Figure 1]
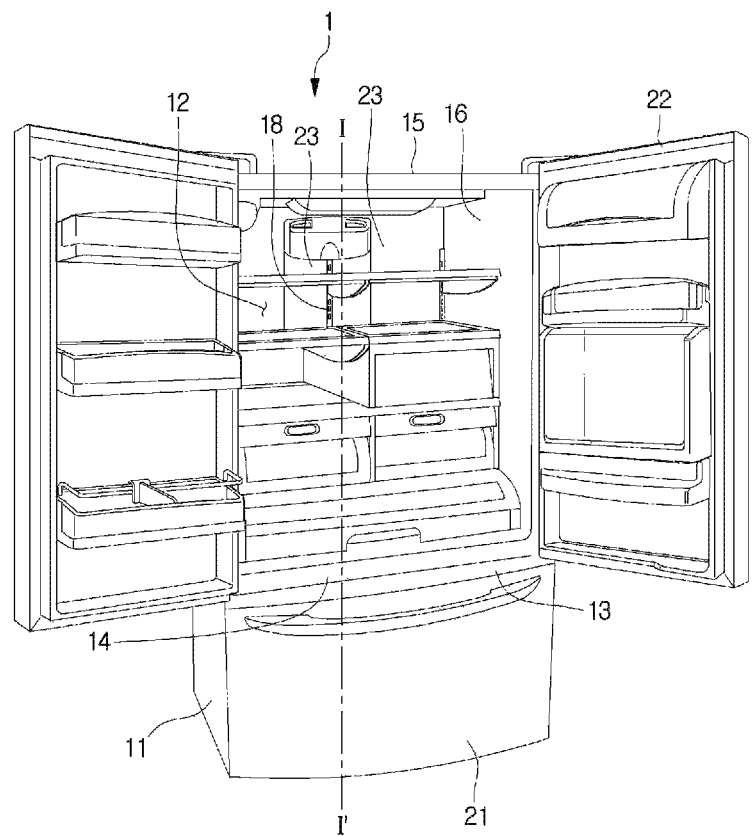

[Figure 2]
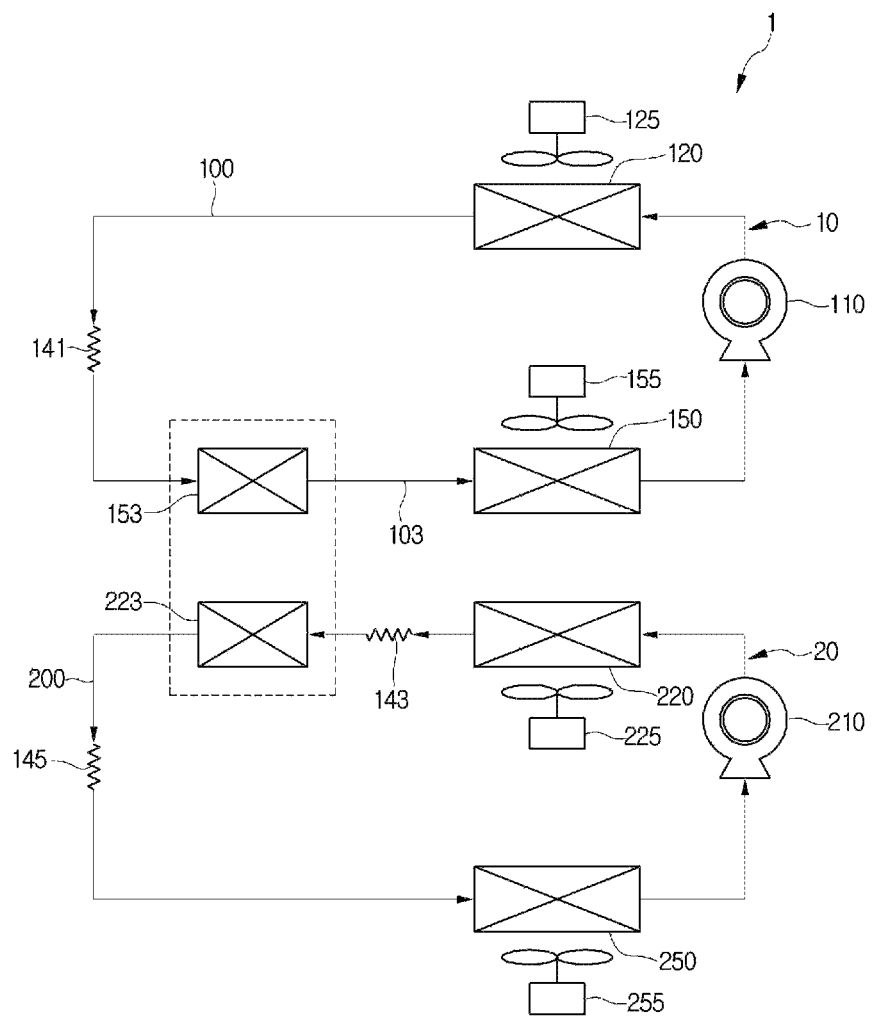

【Figure 3】
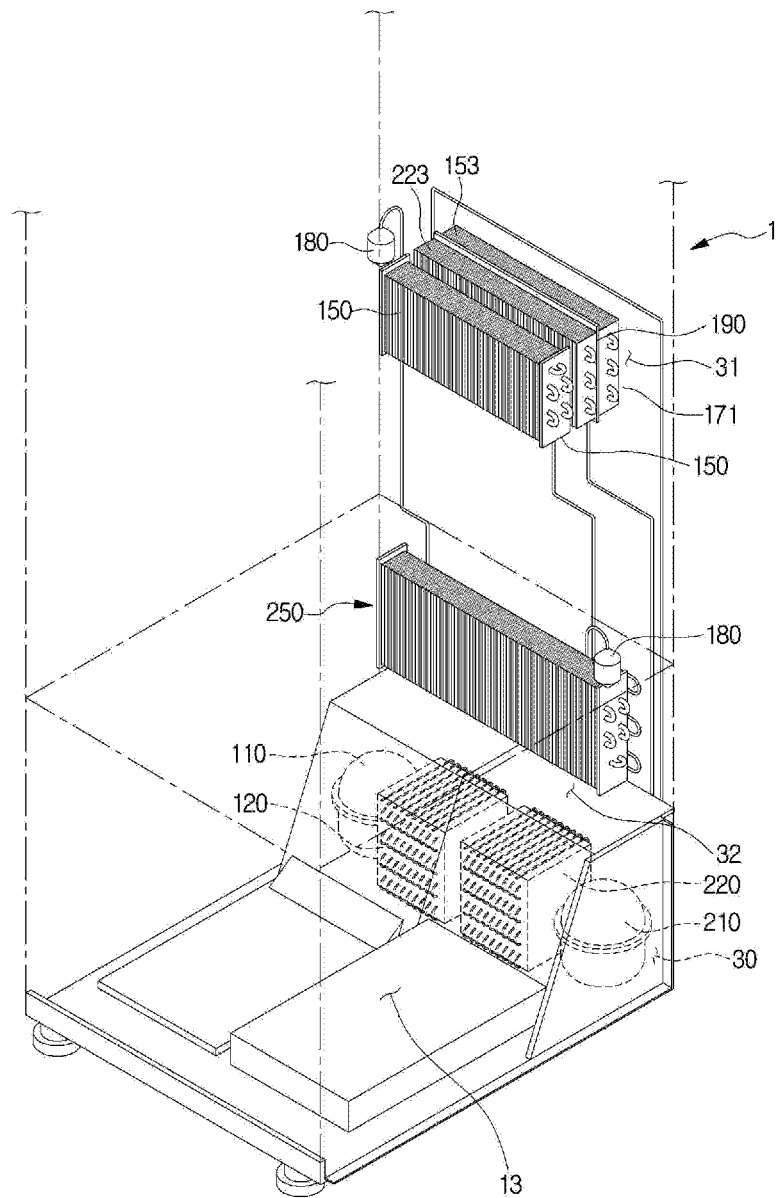

【Figure 4】
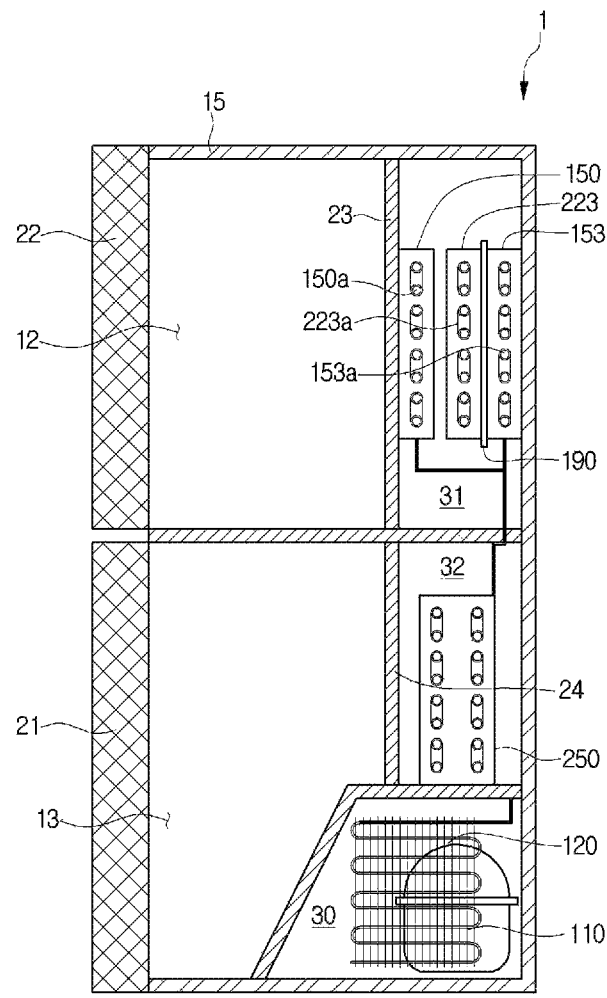

[Figure 5]
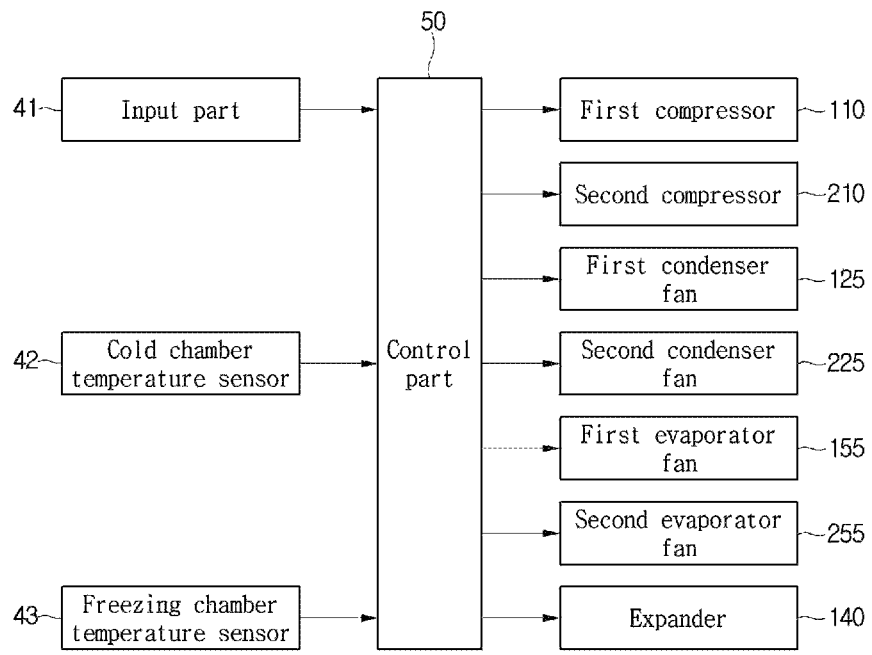

[Figure 6]
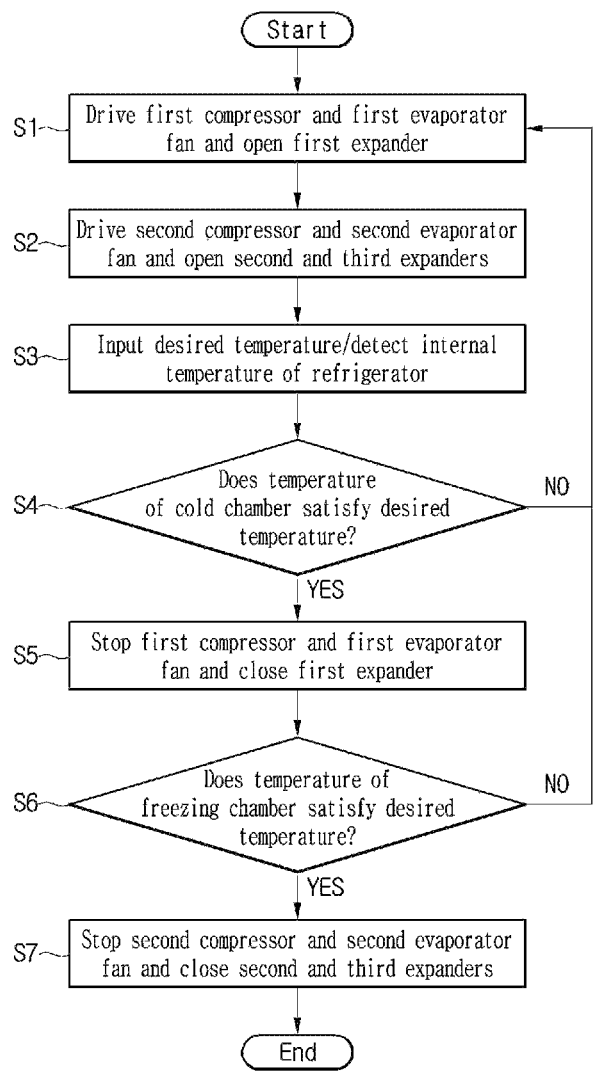

[Figure 7]
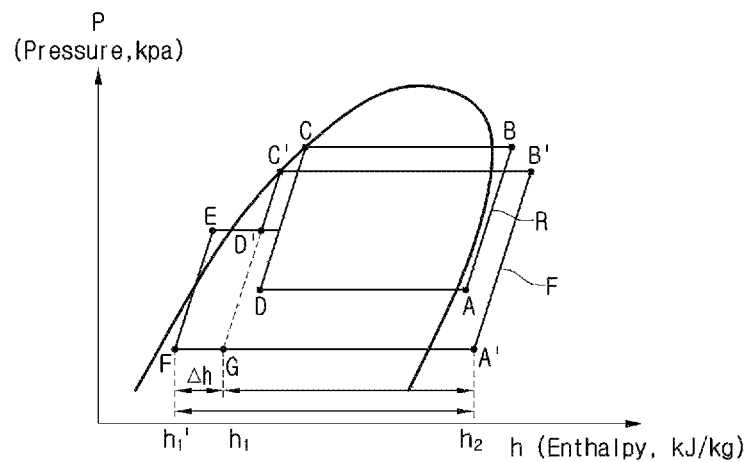

[Figure 8]
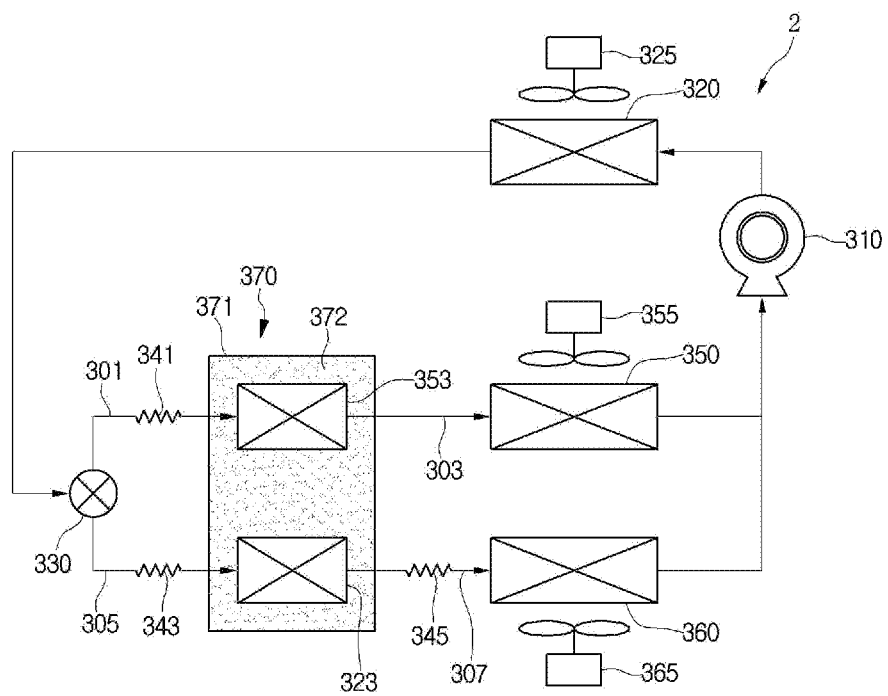

[Figure 9]
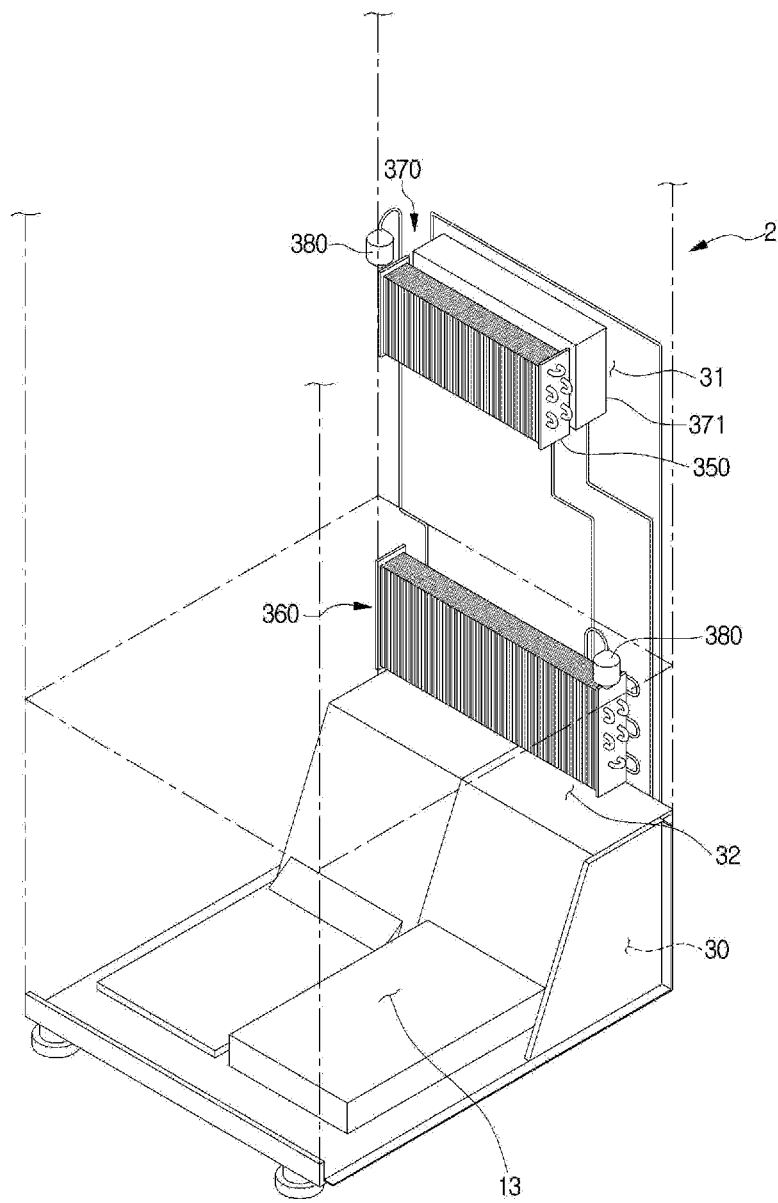

[Figure 10]
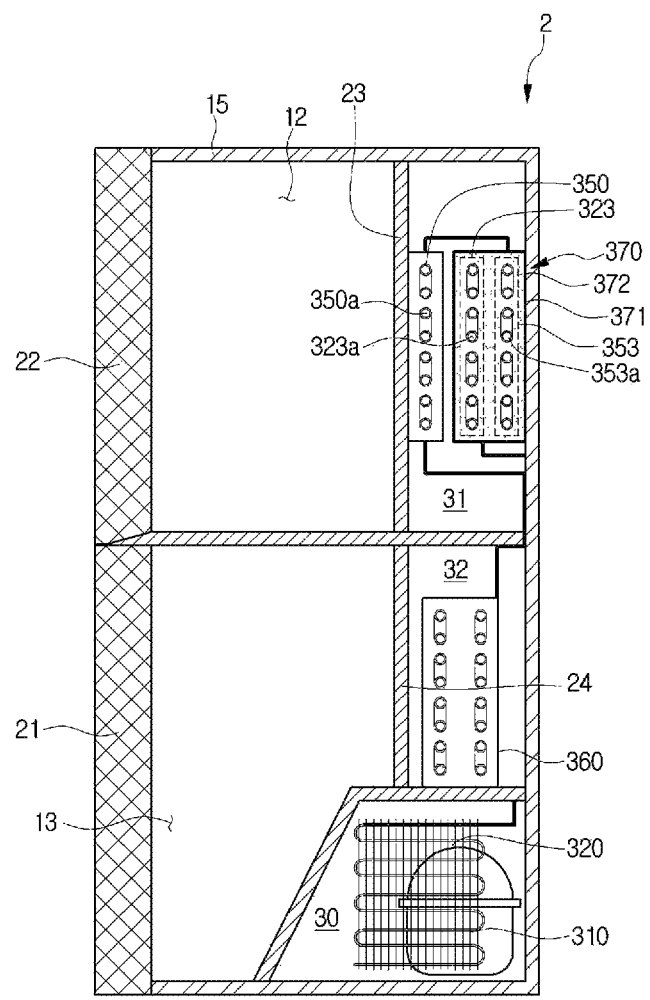

[Figure 11]
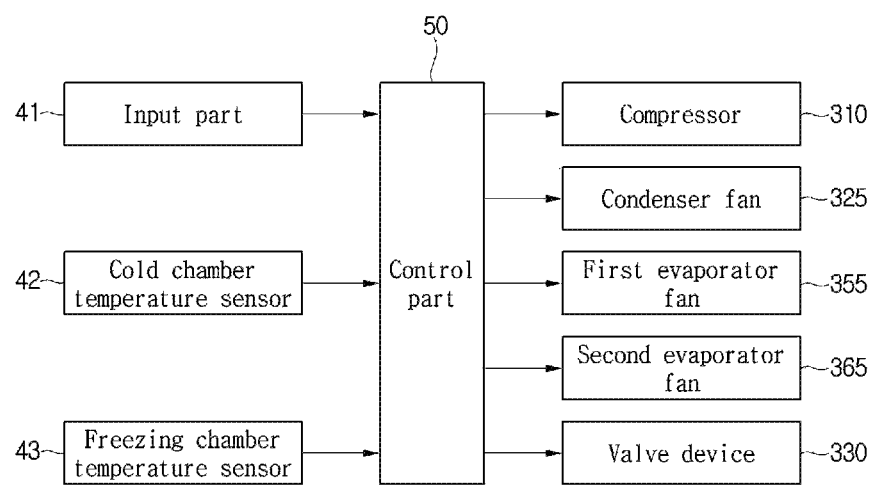

[Figure 12]
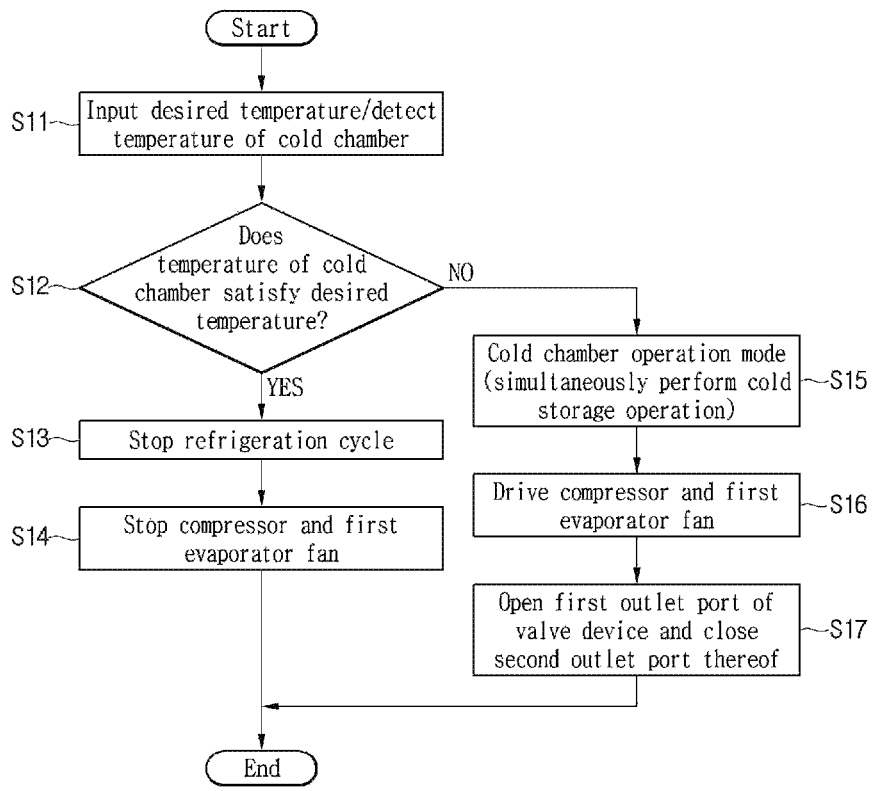

[Figure 13]
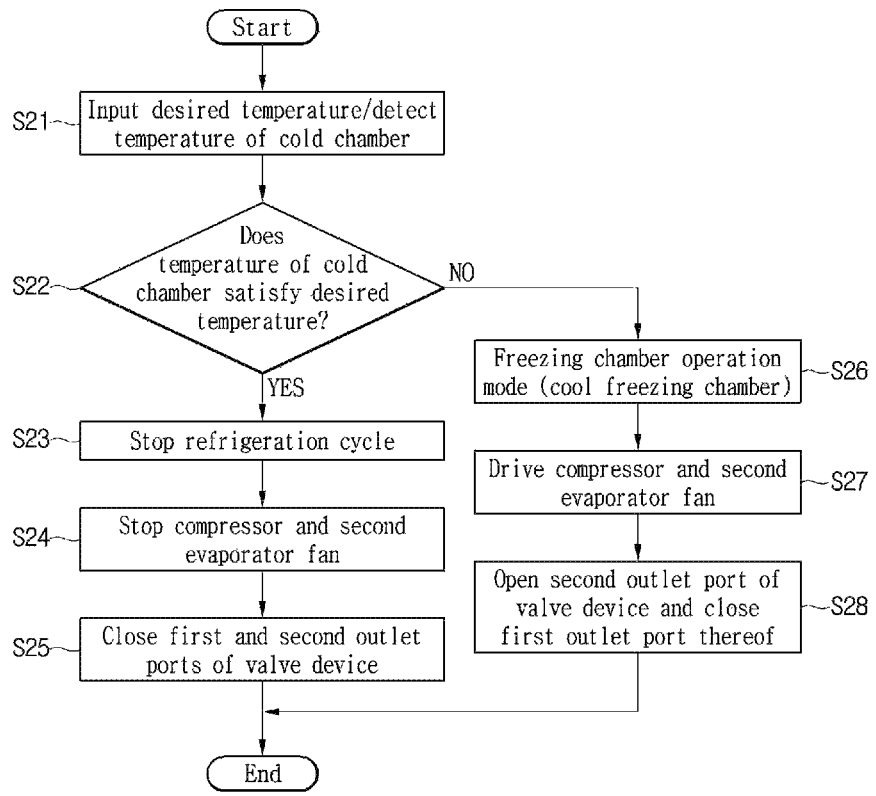

[Figure 14]
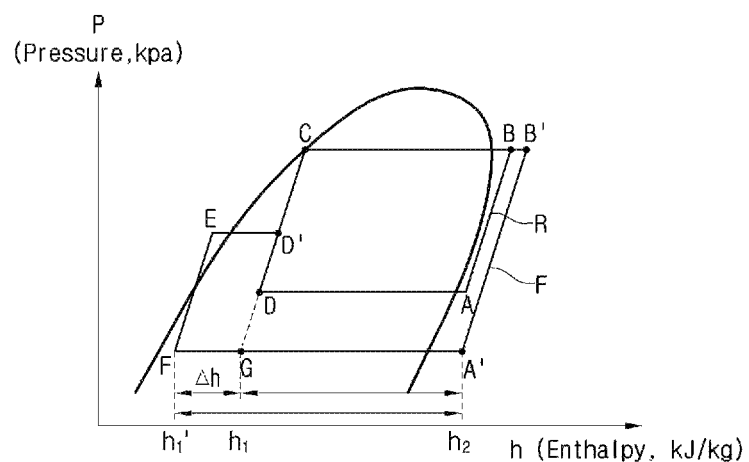

[Figure 15]
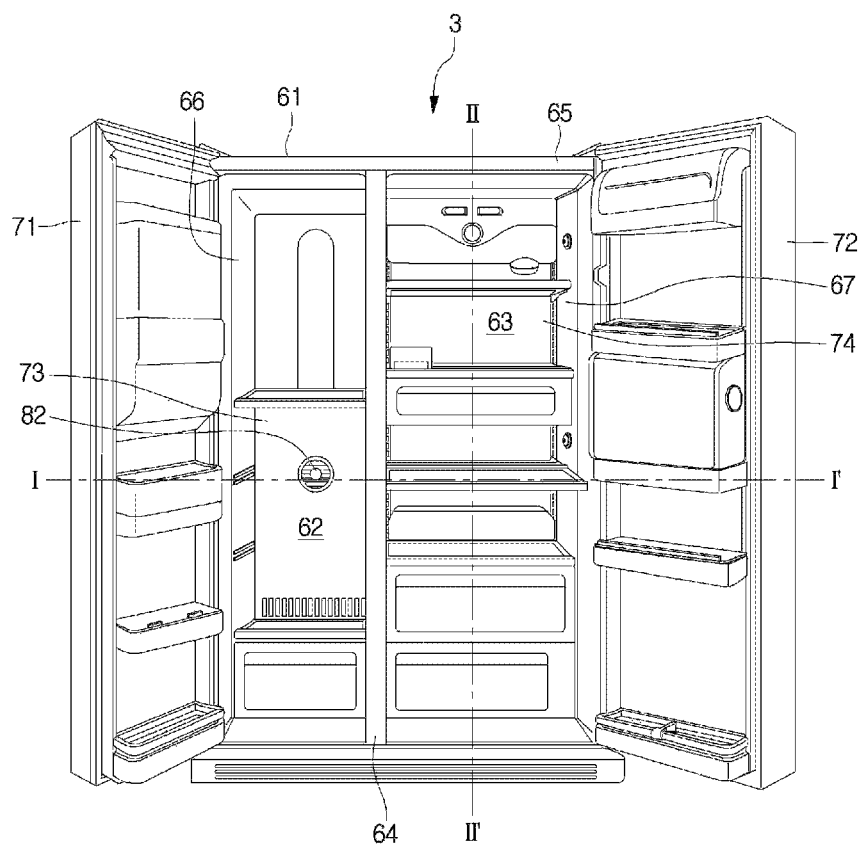

[Figure 16]
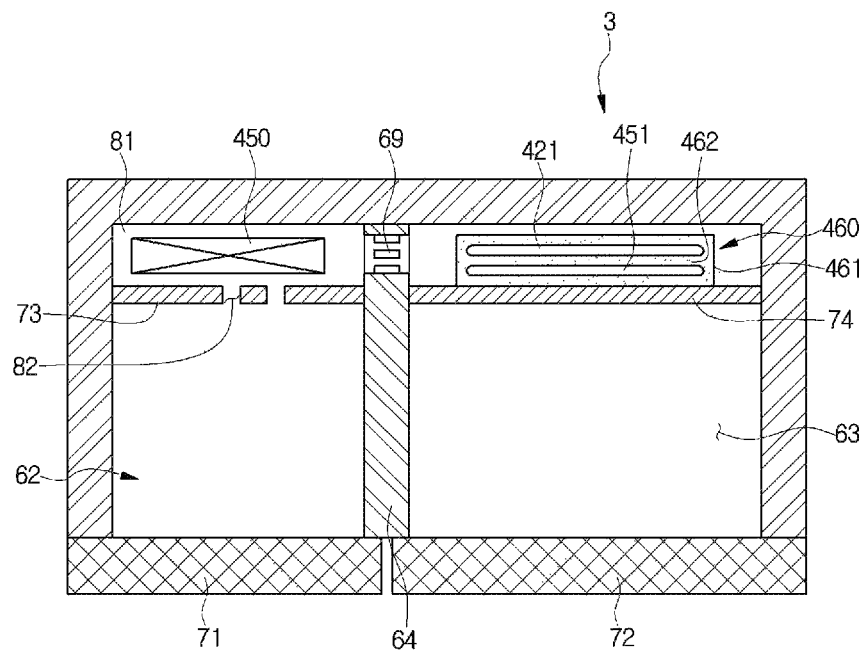

【Figure 17】
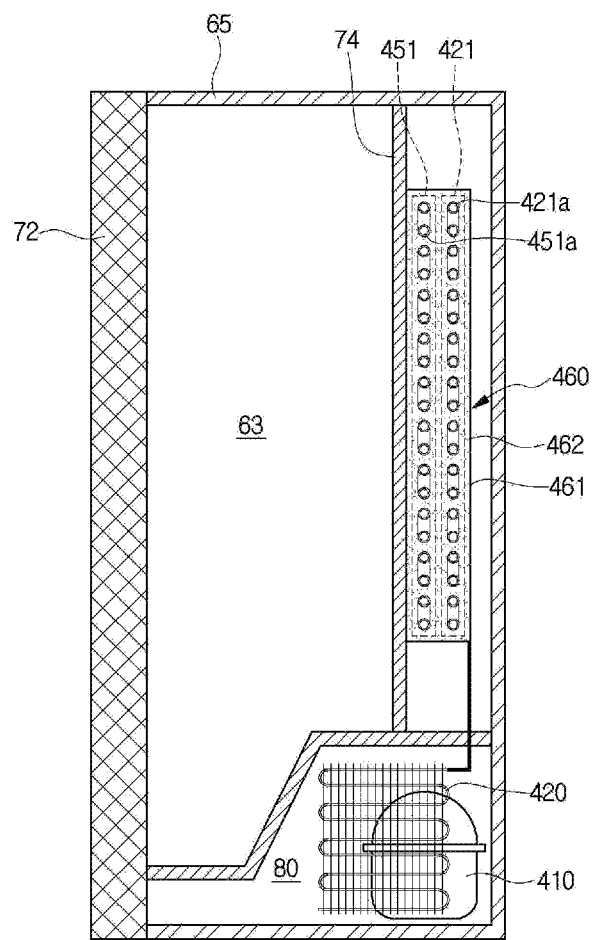

[Figure 18]
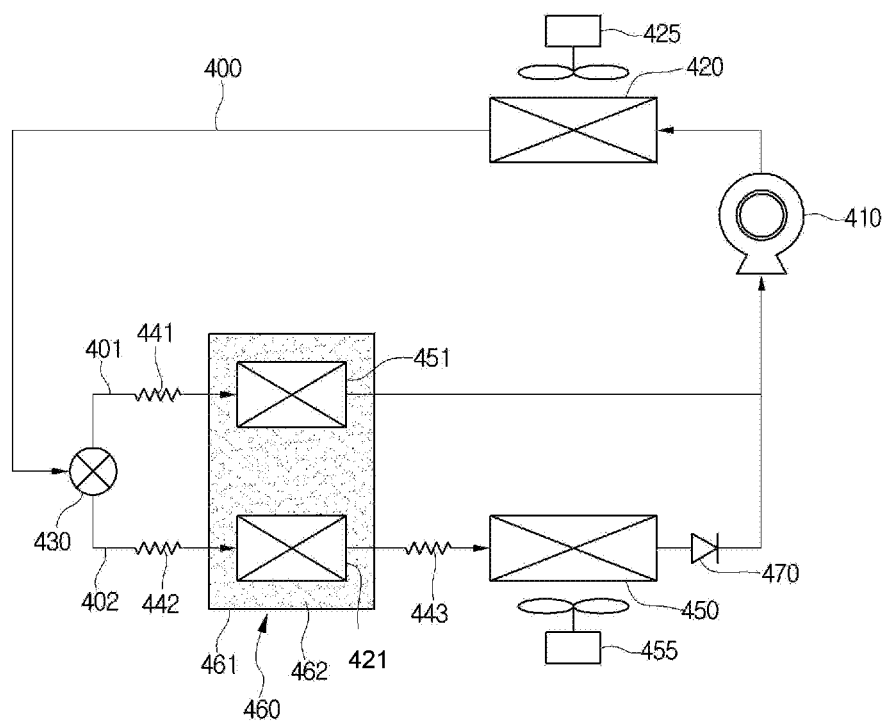

[Figure 19]
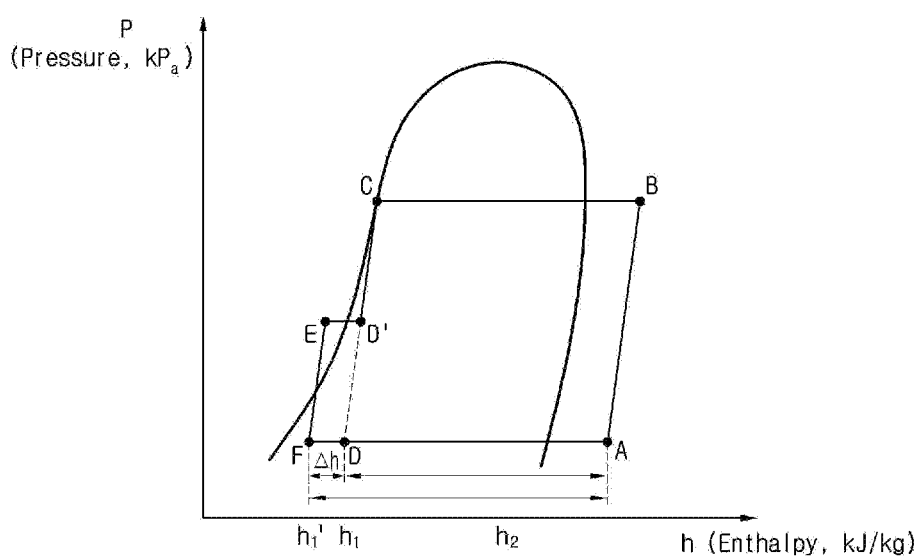

[Figure 20]
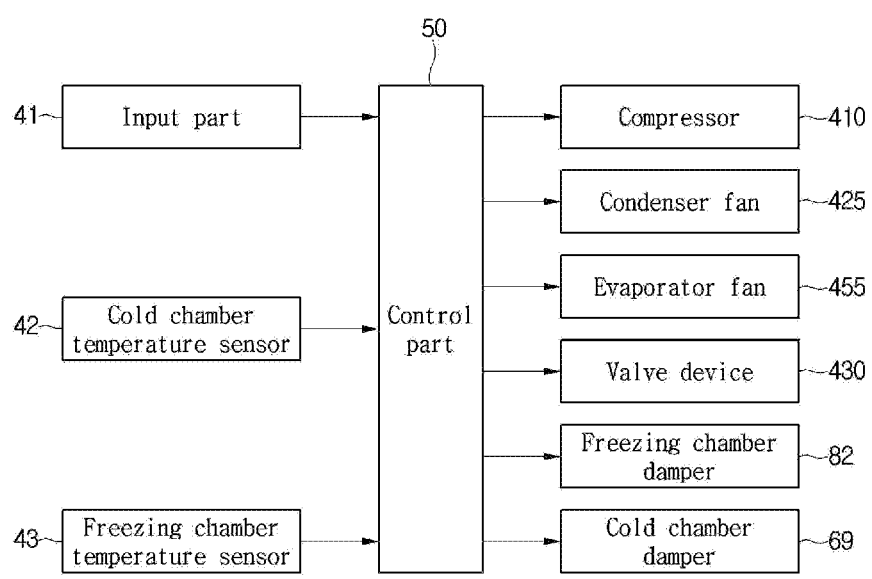

[Figure 21]
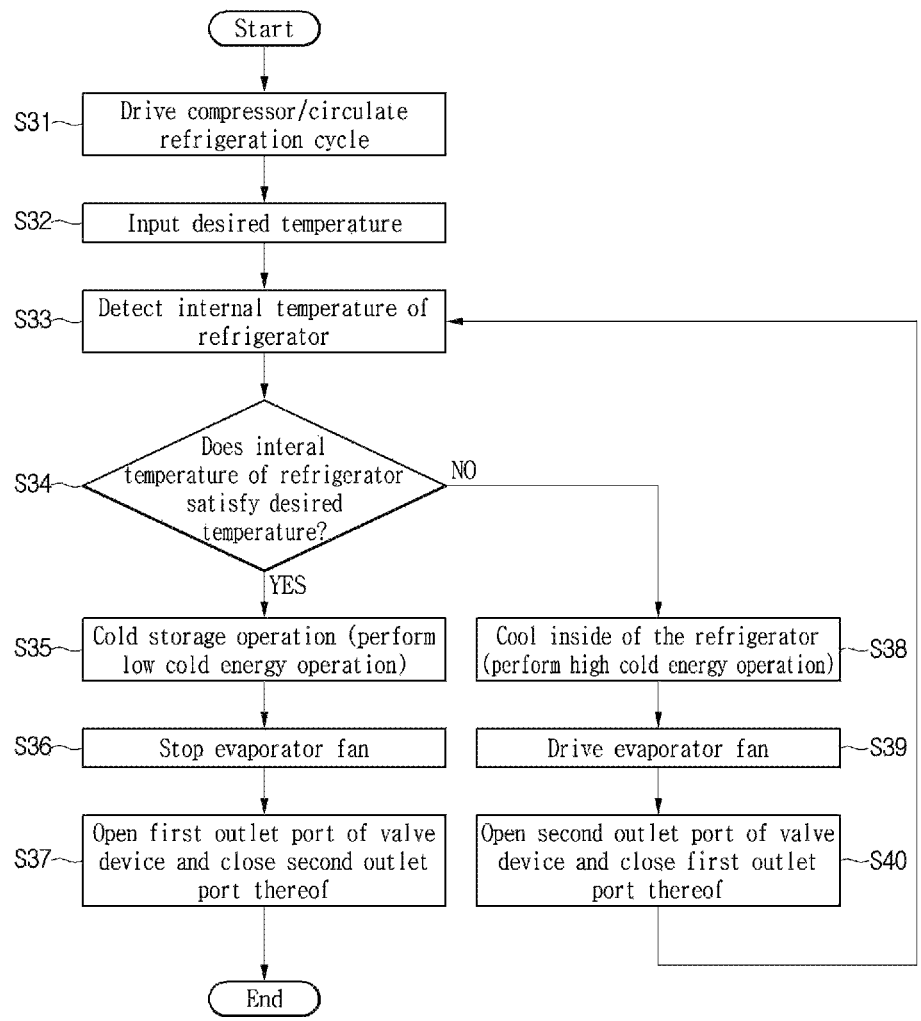

REFRIGERATOR AND CONTROL METHOD THEREOF

CROSS REFERENCE TO RELATED APPLICATIONS

This application is a U.S. National Phase Application under 35 U.S.C. § 371 of International Application PCT/KR2015/007341, filed on Jul. 15, 2015, which claims the benefit of Korean Application No. KR 10-2014-0092179, Korean Application No. KR 10-2014-0092180, and Korean Application No. KR 10-2014-0092181, all filed on Jul. 21, 2014, the entire contents of which are hereby incorporated by reference in their entireties.

TECHNICAL FIELD

The present disclosure relates to a refrigerator and a control method thereof.

BACKGROUND ART

Generally, a refrigerator has a plurality of storage chambers for accommodating stored things to keep food frozen or refrigerated, and one surface of each of the storage chambers is formed to be opened for the food to be received or taken out. The plurality of storage chambers include a freezing chamber for keeping the food frozen and a refrigerating chamber for keeping the food refrigerated.

In the refrigerator, a refrigeration system in which a refrigerant is circulated is driven. The refrigeration system includes a compressor, a condenser, an expander and an evaporator. The evaporator may include a first evaporator which is provided at one side of the refrigerating chamber, and a second evaporator which is provided at one side of the freezing chamber.

Recently, a refrigerator in which the evaporator and the expander are installed at the refrigerating chamber and the freezing chamber, respectively has been developed. In this refrigerator, an amount of the refrigerant supplied from the compressor to each evaporator is adjusted by controlling each expander, and each internal temperature of the refrigerating chamber and the freezing chamber are maintained at a cold temperature and a freezing temperature.

Also, in consideration of target temperatures of the freezing chamber and the refrigerating chamber that are considerably different from each other, a refrigerator in which a compressor for freezing and a compressor for refrigeration having different refrigeration capacities from each other are installed has been developed. In this refrigerator, each compressor is controlled based on the target temperatures of the refrigerating chamber and the freezing chamber, and thus each internal temperature of the refrigerating chamber and the freezing chamber are maintained at the target temperatures.

Here, the refrigeration capacity of the compressor for refrigeration is reduced to about 60% of that of a conventional compressor to increase an evaporation temperature of the refrigeration cycle for cooling the refrigerating chamber.

That is, the refrigeration further includes a small compressor having a small refrigeration capacity to increase the evaporation temperature of the refrigeration cycle for cooling the refrigerating chamber.

However, in a conventional refrigeration system, a subsidiary condenser may be provided so that a plurality of condensing processes are performed in the refrigeration cycle in some cases, but, in this case, there is a problem in that a radiant value of a main condenser is lowered due to the subsidiary condenser, and thus cooling efficiency is reduced.

DISCLOSURE

Technical Problem

The present disclosure is directed to providing a refrigerator in which an expander is additionally provided between a condenser and a subsidiary condenser to effectively cool a plurality of storage chambers.

Technical Solution

One aspect of the present disclosure provides a refrigerator including a main body having a storage chamber; a compressor configured to compress a refrigerant; a condenser configured to condense the refrigerant compressed by the compressor; an evaporation expander configured to depressurize the refrigerant condensed by the condenser; a first evaporator configured to evaporate the refrigerant depressurized by the evaporation expander and thus to cool the storage chamber; a condensing expander installed between the condenser and the evaporation expander and configured to depressurize the refrigerant condensed by the condenser; and a subsidiary condenser installed between the condensing expander and the evaporation expander and configured to condense the refrigerant depressurized by the condensing expander.

The refrigerator may further include a refrigerant pipe configured to guide a flow of the refrigerant condensed by the condenser; a first branch passage branched from the refrigerant pipe; a second branch passage branched from the refrigerant pipe and in which the condensing expander is installed; and a valve device installed at the refrigerant pipe and configured to branch the refrigerant to the first and second branch passages, and the evaporation expander, the first evaporator, the condensing expander, and the subsidiary condenser are installed at the second branch passage.

A cold storage expander configured to depressurize the refrigerant condensed by the condenser and a cold storage evaporator configured to evaporate the refrigerant depressurized by the cold storage expander may be installed at the first branch passage.

The refrigerator may further include a cold storage part having a phase change material (PCM) therein and in which the subsidiary condenser and the cold storage evaporator are installed, and the cold storage part may exchange heat with each of the subsidiary condenser and the cold storage evaporator.

The valve device may be a three-way valve having one inlet port and first and second outlet ports, and the first branch passage may be connected with the first outlet port, and the second branch passage may be connected with the second outlet port.

The refrigerator may further include an input part configured to receive an input of a desired temperature of the storage chamber, and a temperature sensor provided at an inside of the storage chamber, and, when a temperature detected by the temperature sensor satisfies the desired temperature, the first outlet port is opened and the second outlet port is closed by the valve device and thus the refrigerant is guided to flow to the cold storage evaporator.

When the temperature detected by the temperature sensor does not satisfy the desired temperature, the second outlet port is opened and the first outlet port is closed by the valve device and thus the refrigerant is guided to flow to the first evaporator.

The refrigerator may further include a check valve installed at an entrance side of the first evaporator to guide a one-way flow of the refrigerant.

The storage chamber may include a refrigerating chamber and a freezing chamber, and the first evaporator may be installed at a rear wall of the freezing chamber, and the cold storage evaporator and the subsidiary condenser may be installed at a rear wall of the refrigerating chamber.

The refrigerator may further include a second evaporator installed at an exit side of the cold storage evaporator to evaporate again the refrigerant evaporated by the cold storage evaporator.

Another aspect of the present disclosure provides a refrigerator including a first refrigeration system including a first compressor, a first condenser, a first evaporation expander, and a first evaporator; and a second refrigeration system including a second compressor, a second condenser, a second evaporation expander and a second evaporator and configured to exchange heat with the first refrigeration system, wherein the second refrigeration system include a condensing expander configured to depressurize a refrigerant condensed by the second condenser, and a subsidiary condenser installed between the second evaporation expander and the condensing expander and configured to further condense the refrigerant depressurized by the condensing expander.

The refrigerator may further include a subsidiary evaporator configured to evaporate the refrigerant depressurized by the first evaporation expander.

Still another aspect of the present disclosure provides a method of controlling a refrigerator which includes a compressor, a condenser, an evaporator configured to cool a storage chamber, an evaporation expander provided at an entrance side of the evaporator to depressurize a refrigerant, and a cold storage evaporator configured to store cold air in a cold storage part, including driving the compressor, and introducing the refrigerant passing through the condenser into at least one of the evaporator and the cold storage evaporator by a valve device; and determining whether a temperature of the storage chamber satisfies a desired temperature, wherein, when the temperature of the storage chamber does not satisfy the desired temperature, the refrigerant flows through a condensing expander provided at an entrance side of the evaporator and a subsidiary condenser, and is introduced into the evaporator.

When the temperature of the storage chamber satisfies the desired temperature, the refrigerant flows through a cold storage expander provided at an entrance side of the cold storage evaporator and a subsidiary condenser, and is introduced into the cold storage evaporator.

Advantageous Effects

According to the embodiment proposed in the present disclosure, the radiant value of the condenser can be prevented from being lowered due to the subsidiary condenser, and thus the cooling efficiency of the refrigeration cycle can be increased.

Also, since the phase change material (PCM) is used as the cold storage material, the heat exchanging efficiency of the heat exchanger can be enhanced, and the internal temperature of the refrigerator can be constantly maintained.

Also, since a separate device for increasing the cooling efficiency, except the additional expander, is not provided, an internal design of the refrigerator is simple, and the space of the storage chamber can be effectively used.

Also, since the present disclosure has a simple cycle structure, the manufacturing cost thereof can be reduced.

DESCRIPTION OF DRAWINGS

Embodiments will be described in detail with reference to the following drawings in which like reference numerals refer to like elements, and wherein:

FIG. 1 is a view illustrating an internal structure of a refrigerator according to an embodiment of the present disclosure;

FIG. 2 is a system view illustrating a refrigeration cycle structure of the refrigerator according to the embodiment of the present disclosure;

FIG. 3 is a view illustrating a partial structure of the refrigerator according to the embodiment of the present disclosure;

FIG. 4 is a cross-sectional view taken along a line I-I of FIG. 1;

FIG. 5 is a control block diagram of the refrigerator according to the embodiment of the present disclosure;

FIG. 6 is a flowchart illustrating a method of controlling the refrigerator according to the embodiment of the present disclosure;

FIG. 7 is a graph illustrating a P-H diagram of a refrigerant circulated in the refrigerator according to the embodiment of the present disclosure;

FIG. 8 is a system view illustrating a refrigeration cycle structure of a refrigerator according to another embodiment of the present disclosure;

FIG. 9 is a view illustrating a partial structure of the refrigerator according to another embodiment of the present disclosure;

FIG. 10 is a longitudinal cross-sectional view of the refrigerator according to another embodiment of the present disclosure;

FIG. 11 is a control block diagram of the refrigerator according to another embodiment of the present disclosure;

FIGS. 12 and 13 are flowcharts illustrating a method of controlling the refrigerator according to another embodiment of the present disclosure;

FIG. 14 is a graph illustrating a P-H diagram of a refrigerant circulated in the refrigerator according to another embodiment of the present disclosure;

FIG. 15 is a view illustrating an internal structure of a refrigerator according to still another embodiment of the present disclosure;

FIG. 16 is a transverse cross-sectional view taken along a line I-I' of FIG. 15;

FIG. 17 is a longitudinal cross-sectional view taken along a line II-II of FIG. 15;

FIG. 18 is a view illustrating a refrigeration cycle structure of the refrigerator according to still another embodiment of the present disclosure;

FIG. 19 is a graph illustrating a P-H diagram of a refrigerant circulated in the refrigerator according to still another embodiment of the present disclosure;

FIG. 20 is a control block diagram of the refrigerator according to still another embodiment of the present disclosure; and FIG. 21 is a flowchart illustrating a method of controlling the refrigerator according to still another embodiment of the present disclosure.

MODE FOR INVENTION

Hereinafter, embodiments will be described in detail with reference to the accompanying drawings. The embodiments may, however, be embodied in many different forms and should not be construed as being limited to the embodiments set forth herein; rather, alternate embodiments falling within the spirit and scope will fully convey the concept to those skilled in the art.

FIG. 1 is a view illustrating an internal structure of a refrigerator according to an embodiment of the present disclosure.

Referring to FIG. 1, the refrigerator 1 according to the embodiment of the present disclosure includes a main body 11 of which a front surface is opened, and a storage chamber which is formed at an inside of the main body 11.

The storage chamber includes a refrigerating chamber 12 and a freezing chamber 13. The refrigerating chamber 12 and the freezing chamber 13 may be divided by a division part 14. The refrigerating chamber 12 and the freezing chamber 13 may be referred to as a "first storage chamber" and a "second storage chamber," respectively.

The refrigerator 1 may include an outer case 15 which forms an exterior thereof, a refrigerating chamber inner case 16, and a freezing chamber inner case (not shown).

The refrigerating chamber inner case 16 is disposed at an inside of the outer case 15 to form an inner surface of the refrigerating chamber 12. Also, the freezing chamber inner case (not shown) is disposed at the inside of the outer case 15 to form an inner surface of the freezing chamber 13.

The refrigerator 1 may further include a freezing chamber door 21 and a refrigerating chamber door 22 which are coupled to a front side of the main body 11 to selectively open and close the freezing chamber 13 and the refrigerating chamber 12.

In the embodiment, a bottom freezer type in which the freezing chamber is formed at a lower portion thereof and the refrigerating chamber is formed at an upper portion thereof will be described as an example. However, the spirit of the present disclosure may be applied to not only the above-described structure of the refrigerator, but also a top mount type in which the freezing chamber is formed at an upper portion thereof and the refrigerating chamber is formed at a lower portion thereof, or a side-by-side type in which the freezing chamber and the refrigerating chamber are provided at left and right sides thereof.

The refrigerator 1 may further include a refrigerating chamber cover plate 23 provided at the refrigerating chamber 12. The refrigerating chamber cover plate 23 may be provided at a rear surface of the refrigerating chamber 12.

A cold air discharging part 18 through which cold air is discharged to the refrigerating chamber 12 may be provided at the refrigerating chamber cover plate 23.

A refrigerating chamber cover plate (not shown) having cold air discharging part (not shown) through which cold air is discharged may be also provided at a rear surface of the freezing chamber 13.

FIG. 2 is a system view illustrating a refrigeration cycle structure of the refrigerator according to the embodiment of the present disclosure.

Referring to FIG. 2, the refrigerator 1 according to the embodiment of the present disclosure includes a first refrigeration system 10 and a second refrigeration system 20. Each of the first and second refrigeration systems 10 and 20 includes a plurality of devices for driving a refrigeration cycle.

The first refrigeration system 10 includes a first compressor 110 which compresses a first refrigerant flowing in the first refrigeration system 10 and discharges the first refrigerant in a high temperature and high pressure state, a first condenser 120 which condenses the first refrigerant compressed by the first compressor 110 and maintained in the high temperature and high pressure state through radiation of heat, a first expander 141 which receives and depressurizes the refrigerant condensed by the first condenser 120, a subsidiary evaporator 153 which evaporates the refrigerant depressurized by the first expander 141, and a first evaporator 150 which evaporates the first refrigerant flowing in the subsidiary evaporator 153. The first expander 141 may be referred to as a "first evaporation expander."

The first refrigeration system 10 includes a refrigerant pipe 100 which connect the first compressor 110, the first condenser 120, the first expander 141, the subsidiary evaporator 153, and the first evaporator 150 to guide a flow of the refrigerant.

The second refrigeration system 20 includes a second compressor 210 which compresses a second refrigerant flowing in the second refrigeration system 20 and discharges the second refrigerant in a high temperature and high pressure state, a second condenser 220 which condenses the second refrigerant compressed by the second compressor 210 and maintained in the high temperature and high pressure state through radiation of heat, a second expander 143 which receives and depressurizes the refrigerant condensed by the second condenser 220, a subsidiary condenser 223 which condenses once more the second refrigerant depressurized by the second expander 143, a third expander 145 which depressurizes the second refrigerant condensed by the subsidiary condenser 223, and a second evaporator 250 which evaporates the second refrigerant depressurized by the third expander 145. The second expander 143 performs depressurizing for subsidiary condensing, and thus may be referred to as a "condensation expander," and the third expander 145 may be referred to as a "second evaporation expander."

In the subsidiary condenser 223, the refrigerant is condensed at a lower pressure than that in the second condenser 220. The second expander 143 may prevent a radiant value of the condenser 120 from being reduced due to the subsidiary condenser 121.

The subsidiary condenser 223 may be installed adjacent to the subsidiary evaporator 153 so as to exchange heat with the subsidiary evaporator 153. Specifically, the second refrigerant flowing through the subsidiary condenser 223 may be condensed using the cold air generated when the subsidiary evaporator 153 evaporates the first refrigerant. The subsidiary condenser 223 and the subsidiary evaporator 153 may be in contact with each other, but heat may be exchanged using a heat exchange plate 190 which will be described later.

When the refrigerant condensed by the second condenser 220 is depressurized by the second expander 143, and then introduced into and condensed once more by the subsidiary condenser 223, cooling performance may be enhanced. Enhancement of the cooling efficiency will be described later in detail with reference to FIG. 7.

The first to third expanders 141, 143, and 145 may be commonly referred to as an expander 140, and may be opened and closed according to a driving signal of a control part.

Specifically, when a refrigeration temperature of the refrigerating chamber 12 is higher than a first target temperature, the first expander 141 may be opened so that the first refrigerant is supplied to the first evaporator 150, and when the refrigeration temperature of the refrigerating chamber 12 arrives at the first target temperature, the first expander 141 may be closed so that the first refrigerant supplied to the first evaporator 150 is blocked.

When a freezing temperature of the freezing chamber 13 is higher than a second target temperature, the second and third expanders 143 and 145 may be opened so that the second refrigerant is supplied to the second evaporator 250, and when the freezing temperature of the freezing chamber 13 arrives at the second target temperature, the second and third expanders 143 and 145 may be closed so that the refrigerant supplied to the second evaporator 250 is blocked. Even when one of the second and third expanders 143 and 145 is closed, the refrigerant supplied to the second evaporator 250 may be blocked.

That is, the refrigerant is supplied to the first and second evaporators 150 and 250 according to opening driving of each of the first to third expanders 141, 143 and 145. The first to third expanders 141, 143, and 145 may include capillary tubes.

When the first expander 141 is opened and thus the first refrigerant is supplied, the first evaporator 150 serves to cool surrounding air and air in the refrigerating chamber 12 due to an cooling effect, and thus to lower a temperature of the refrigerating chamber 12, and when the second and third expanders 143 and 145 are opened and thus the second refrigerant is supplied, the second evaporator 250 serves to cool surrounding air and air in the freezing chamber 13 due to the cooling effect, and thus to lower a temperature of the freezing chamber 13.

In the first and second refrigeration systems 10 and 20, refrigerants which have different refrigeration capacities per unit volume may be circulated to perform a cooling operation.

The first refrigeration system 10 may further include blower fans 125 and 155 which are provided at one side of the first condenser 120 or the first evaporator 150 to blow air. The blower fans 125 and 155 may include a first condenser fan 125 which is provided at one side of the condenser 120, and a first evaporator fan 155 which is provided at one side of the evaporator 150.

Also, the second refrigeration system 20 may further include blower fans 225 and 255 which are provided at one side of the second condenser 220 or the second evaporator 250 to blow air.

The blower fans 225 and 255 may include a second condenser fan 225 which is provided at one side of the second condenser 220, and a second evaporator fan 255 which is provided at one side of the second evaporator 250.

Heat exchanging performance of the first and second evaporators 150 and 250 may be changed according to RPMs of the first and second evaporator fans 155 and 255. For example, when more cold air is required due to an operation of the first evaporator 150, the RPM of the first evaporator fan 155 may be increased, and when the cold air is sufficient, the RPM of the first evaporator fan 155 may be reduced.

FIG. 3 is a view illustrating a partial structure of the refrigerator according to the embodiment of the present disclosure, and FIG. 4 is a cross-sectional view taken along a line I-I' of FIG. 1.

Referring to FIGS. 3 and 4, the refrigerator 1 according to the embodiment of the present disclosure may include a machinery chamber 30 which is formed at the lower portion of the refrigerator 1, a first refrigeration chamber 31 which supplies the cold air to the refrigerating chamber 12, and a second refrigeration chamber 32 which supplies the cold air to the freezing chamber 13. The cold air of the first and second refrigeration chambers 31 and 32 may be discharged to the refrigerating chamber 12 and the freezing chamber 13 through the cold air discharging part 18.

The first and second compressors 110 and 210 and the first and second condensers 120 and 220 may be installed at the machinery chamber 30.

The first refrigeration chamber 31 may be provided at a rear wall of the refrigerating chamber 12, and may be formed between the refrigerating chamber inner case 16 and the refrigerating chamber cover plate 23. The first evaporator 150, the subsidiary condenser 223, and the subsidiary evaporator 153 may be installed at the first refrigeration chamber 31.

The first evaporator 150 may be in contact with the refrigerating chamber cover plate 23, and may be fixed to the refrigerating chamber cover plate 23 by a holder (not shown).

The heat exchange plate 190 may be provided between the subsidiary condenser 223 and the subsidiary evaporator 153. The subsidiary condenser 223, the subsidiary evaporator 153, and the heat exchange plate 190 may be in contact with each other in order, and the subsidiary condenser 223 may exchange heat with the subsidiary evaporator 153 through the heat exchange plate 190.

The subsidiary evaporator 153 may be in contact with the refrigerating chamber inner case 16. Also, the subsidiary evaporator 153 may be fixed by the holder (not shown) provided at the refrigerating chamber inner case 16, and the subsidiary condenser 223 may be fixed to the heat exchange plate 190.

As illustrated in the drawing, the subsidiary condenser 223 may be spaced from or in contact with the first evaporator 150.

A refrigerant pipe 150a of the first evaporator 150, a refrigerant pipe 153a of the subsidiary evaporator 153, and a refrigerant pipe 223a of the subsidiary condenser 223 may be bent and extend vertically.

Since the refrigerant pipe 150a of the first evaporator 150, the refrigerant pipe 153a of the subsidiary evaporator 153, and the refrigerant pipe 223a of the subsidiary condenser 223 are vertically installed adjacent to each other, an installation space for the plurality of devices forming the refrigeration cycle may be reduced. Therefore, a storage space of the storage chamber may be prevented from being reduced.

The second refrigeration chamber 32 may be provided at a rear wall of the freezing chamber 13, and may be formed between the freezing chamber inner case and the freezing chamber cover plate 24. The second evaporator 250 may be installed at the second refrigeration chamber 32.

A gas-liquid separator 180 which filters a liquid refrigerant out of the refrigerant evaporated by the first and second evaporators 150 and 250 and supplies a gas phase refrigerant to the first and second compressors 110 and 210 may be provided at one side of each of the first and second evaporators 150 and 250.

FIG. 5 is a control block diagram of the refrigerator according to the embodiment of the present disclosure, and FIG. 6 is a flowchart illustrating a method of controlling the refrigerator according to the embodiment of the present disclosure.

Referring to FIGS. 5 and 6, the refrigerator 1 according to the embodiment of the present disclosure may include a control part 50, an input part 41 which allows a user to input a desired temperature of the freezing chamber and a desired temperature of the refrigerating chamber, a refrigerating chamber temperature sensor 42 which detects a temperature of the refrigerating chamber 12, and a freezing chamber temperature sensor 43 which detects a temperature of the freezing chamber 13. The refrigerating chamber temperature sensor 42 and the freezing chamber temperature sensor 43 may be referred to as a "first temperature sensor" and a "second temperature sensor," and may be commonly called "temperature sensors."

The control part 50 may control the first and second compressors 110 and 210, the first and second condenser fans 125 and 225, the first and second evaporator fans 155 and 255, and the expanders 140 according to whether the temperatures detected by the temperature sensors 42 and 43 satisfy the desired temperatures.

A method of controlling the refrigerator 1 according to whether to satisfy the desired temperatures of the refrigerating chamber 12 and the freezing chamber 13 will be described with reference to FIG. 6.

The refrigerator is operated, and the control part 50 performs control so that the refrigeration cycle is circulated in the first refrigeration system 10. Specifically, the control part 50 may control the first compressor 110 and the first evaporator fan 155 to be driven, and may also control the first expander 141 to be opened (S1).

Also, the control part 50 performs control so that the refrigeration cycle is circulated in the second refrigeration system 20. Specifically, the control part 50 may control the second compressor 210 and the second evaporator fan 255 to be driven, and may also control the second and third expanders 143 and 145 to be opened (S2).

At this time, when a predetermined period of time passes after the first compressor 110 is driven, the second compressor 210 may be controlled to be driven, such that the first refrigeration system 10 starts a circulation operation before the second refrigeration system 20. For example, after 3 minutes after the first compressor 110 is driven, the second compressor 210 may be controlled to be driven.

This is because circulation of the refrigerant occurs in the subsidiary evaporator 153 before the subsidiary condenser 223, and thus the second refrigerant may be effectively condensed in the subsidiary condenser 223 due to the air cooled while the first refrigerant is evaporated in the subsidiary evaporator 153.

Then, the desired temperature input by the user is received through the input part 41, and internal temperatures are detected by the refrigerating chamber temperature sensor 42 and the freezing chamber temperature sensor 43 (S3). A process of receiving the input of the desired temperature and a process of detecting the internal temperature may be performed in a different order, and the process of receiving the input of the desired temperature and detecting the internal temperature may be performed before the refrigeration cycle is driven.

First, by comparing the temperature detected by the refrigerating chamber temperature sensor 42 with the desired temperature, it is determined whether the temperature of the refrigerating chamber 12 satisfies the desired temperature (S4). The desired temperature may be temperature range information which does not have a lower limit. That is, the desired temperature information may be set so that the temperature of the refrigerating chamber 12 is maintained to be a certain temperature or less.

When the temperature of the refrigerating chamber 12 satisfies the desired temperature, i.e., the temperature of the refrigerating chamber 12 is lower than the desired temperature, the control part 50 controls the refrigeration cycle of the first refrigeration system 10 to be stopped. Specifically, the control part 50 may control the first compressor 110 and the first evaporator fan 155 to be stopped, and also may control the first expander 141 to be closed (S5).

However, when the temperature of the refrigerating chamber 12 does not satisfy the desired temperature, i.e., the temperature of the refrigerating chamber 12 is higher than the desired temperature, the control part 50 controls the first and second refrigeration systems 10 and 20 to be continuously circulated.

Then, by comparing the temperature detected by the freezing chamber temperature sensor 43 with the desired temperature, it is determined whether the temperature of the freezing chamber 13 satisfies the desired temperature (S6).

When the temperature of the freezing chamber 13 satisfies the desired temperature, i.e., the temperature of the freezing chamber 13 is lower than the desired temperature, the control part 50 controls the refrigeration cycle of the second refrigeration system 20 to be stopped. Specifically, the control part 50 may control the second compressor 210 and the second evaporator 250 to be stopped, and also may control the second expander 143 or the third expander 145 to be closed. Even though one of the second and third expanders 143 and 145 is closed, the circulation of the refrigerant in the second refrigeration system 20 may be stopped (S7).

On the contrary, when the temperature of the freezing chamber 13 does not satisfy the desired temperature, i.e., the temperature of the freezing chamber 13 is higher than the desired temperature, the control part 50 controls the first and second refrigeration systems 10 and 20 to be continuously circulated.

A control process according to whether the temperature of the refrigerating chamber 12 satisfies the desired temperature, and a control process according to whether the temperature of the freezing chamber 13 satisfies the desired temperature may be performed in a different order, and the control processes may be performed at the same time.

FIG. 7 is a graph illustrating a P-H diagram of the refrigerant circulated in the refrigerator according to the embodiment of the present disclosure.

Referring to FIG. 7, R is a diagram representing a refrigerant cycle of the first refrigeration system 10, and F is a diagram representing a refrigerant cycle of the second refrigeration system 20.

When the first refrigerant is circulated in the first refrigeration system 10, the refrigeration cycle is circulated in order of A→B→C→D, and when the refrigerator 1 is in the "freezing chamber operation mode", the refrigeration cycle is circulated in order of A'→B'→C'→D'→E→F. When each of the first refrigerant and the second refrigerant has different refrigeration capacities per unit volume, there may be a difference in a refrigeration effect between the first and second refrigeration systems 10 and 20, as illustrating in FIG. 7.

When the refrigerant is circulated in the first refrigeration system 10, an A-phase refrigerant inhaled into the first compressor 110 is changed into a B-phase after compressed. And the refrigerant condensed by the first condenser 120 has a C-phase.

Then, the C-phase refrigerant is changed into a D-phase after depressurized by the first expander 141, and the refrigerant evaporated by the subsidiary evaporator 153 and the first evaporator 150 has an A-phase.

Meanwhile, when the refrigerant is circulated in the second refrigeration system 20, an A'-phase refrigerant inhaled into the second compressor 210 is changed into a B'-phase after compressed. And the refrigerant condensed by the second condenser 220 has a C'-phase.

Then, the C'-phase refrigerant is introduced into the second expander 143. The refrigerant introduced into and depressurized by the second expander 143 has a D'-phase.

The D'-phase refrigerant depressurized by the second expander 143 is introduced into the subsidiary condenser 223, and then condensed once more. The refrigerant introduced into and condensed by the subsidiary condenser 223 has an E-phase.

Then, the E-phase refrigerant condensed by the subsidiary condenser 223 is introduced into the third expander 145, and depressurized once more. The refrigerant introduced into and depressurized by the third expander 145 has an F-phase.

The F-phase refrigerant depressurized by the first expander 145 is introduced into the second evaporator 250, and the refrigerant introduced into and evaporated by the second evaporator 250 has an A'-phase. According to such a refrigeration cycle, an evaporation capacity at the second evaporator 250 is h2-h1'.

In the subsidiary condenser 223, the refrigerant is condensed at a lower pressure than that in the second condenser 220, and the second expander 143 serves to prevent the radiant value of the condenser 220 from being reduced due to the subsidiary condenser 223.

Meanwhile, in the case of the second refrigeration system 20, when the second expander 143 is not provided at the refrigeration cycle, the C-phase refrigerant condensed by the second condenser 220 and the subsidiary condenser 223 is changed into a G-phase after depressurized by the third expander 145, and the G-phase refrigerant is changed into the A'-phase while being evaporated by the second evaporator 250. According to such a refrigeration cycle, the evaporation capacity at the second evaporator 250 is h2-h1.

Therefore, since the evaporation capacity when the second expander 143 is provided at the refrigeration cycle is h2-h1', and the evaporation capacity when the second expander 143 is not provided at the refrigeration cycle is h2-h1, the evaporation capacity in the case in which the second expander 143 is provided may be increased by Δh, compared to that in the case in which the second expander 143 is not provided.

Therefore, operation performance of the refrigerator may be improved, and a power consumption may be relatively reduced, compared with other refrigerators having the same operation performance. Eventually, operation efficiency of the refrigerator may be enhanced.

Hereinafter, a refrigerator according to another embodiment of the present disclosure will be described.

FIG. 8 is a system view illustrating a refrigeration cycle structure of a refrigerator according to another embodiment of the present disclosure.

The refrigerator of the embodiment is different from that of the previous embodiment in only the refrigerant cycle structure. Therefore, the description overlapping that of the previous embodiment will be omitted. Also, elements having the same or similar functions will be given like reference numerals. The element having the same reference numeral can quote the description in the previous embodiment, except particular portions.

Referring to FIG. 8, the refrigerator 2 according to the embodiment of the present disclosure includes a plurality of devices for driving the refrigeration cycle.

Specifically, the refrigerator 2 may include a compressor 310 which compresses a refrigerant, a condenser 320 which condenses the refrigerant compressed by the compressor 310, a plurality of expanders 341, 343, and 345 which depressurize the refrigerant condensed by the condenser 320, a plurality of evaporators 350, 353, and 360 which evaporate the refrigerant depressurized by the plurality of expanders 341, 343, and 345, and a subsidiary condenser 323 which condenses the refrigerant depressurized by one of the plurality of expanders 341, 343, and 345.

The refrigerator 2 includes a refrigerant pipe 300 which connects the compressor 310, the condenser 320, the expanders 341, 343, and 345, and the evaporators 350 and 360 to guide a flow of the refrigerant.

The plurality of evaporators 350, 353, and 360 include a first evaporator 360 which generates cold air supplied to one of the refrigerating chamber 12 and the freezing chamber 13, a second evaporator 350 which generates the cold air supplied to the other storage chamber, and a cold storage evaporator 353 which is installed adjacent to the subsidiary condenser 323. The subsidiary condenser 323 may be in contact with the cold storage evaporator 353. The first evaporator 360 may be referred to as a "freezing chamber evaporator," and the second evaporator 350 may be referred to as a "refrigerating chamber evaporator."

The first evaporator 360 may generate the cold air supplied to the freezing chamber 13, and may be disposed at one side of the freezing chamber 13. The second evaporator 350 may generate the cold air supplied to the refrigerating chamber 12, and may be disposed at one side of the refrigerating chamber 12.

A temperature of the cold air supplied to the freezing chamber 13 may be lower than that of the cold air supplied to the refrigerating chamber 12, and thus a refrigerant evaporation pressure of the first evaporator 360 may be lower than that of the second evaporator 350.

The refrigerant pipe 300 at exit sides of the first and second evaporators 360 and 350 extends to an entrance side of the compressor 310. Therefore, the refrigerant passing through the first and second evaporators 360 and 350 may be introduced into the compressor 310.

The refrigerator 2 may further include a cold storage part 370 which surrounds the subsidiary condenser 323 and the cold storage evaporator 353, and exchanges heat with the subsidiary condenser 323 or the cold storage evaporator 353.

It may be understood that the cold storage part 370 is an indirect cooling unit for cooling the refrigerating chamber 12. Specifically, the cold storage part 370 includes a case 371 which defines a storage space, and a cold storage material 372 which is stored in an inside of the case 371.

The cold storage material 372 may include a phase change material (PCM) of which a phase is changed at a low temperature to accomplish a cooling effect. For example, the PCM may include water or carbon dioxide.

When the PCM is used as the cold storage material, high density cold air may be stored through an inflow and outflow of a large quantity of cold air during a phase changing process, while a predetermined target temperature is maintained. Also, since a setting temperature may be maintained for a long period of time without external power supply, it is possible to contribute to energy saving.

The cold storage evaporator 353 may be installed at an inside of the case 371 of the cold storage part 370 to evaporate the refrigerant and thus to store the cold air in the cold storage material 372, and the subsidiary condenser 323 may condense the refrigerant using the cold air stored in the cold storage material 372. Also, the subsidiary condenser 323 may be directly in contact with the cold storage evaporator 353 to perform a heat exchanging operation therewith and thus to condense the refrigerant.

The refrigerator 2 includes first and second branch passages 301 and 302 which branch the refrigerant passing through the condenser 320. The first and second branch passages 301 and 302 are branched from the refrigerant pipe 300.

The refrigerator 2 may further include a valve device 330 which is installed at the refrigerant pipe 300 to branch the refrigerant into the first and second branch passages 301 and 302.

The valve device 330 may include a three-way valve having one inlet port through which the refrigerant is introduced, and two outlet ports through which the refrigerant is discharged. The one inlet port is connected to the refrigerant pipe 300, and a first outlet port of the two outlet ports is connected to the first branch passage 301, and a second outlet port is connected to the second branch passage 302. At least one of the first and second outlet ports may be opened according to control of the valve device 330, and thus a flow route of the refrigerant may be changed.

The second evaporator 350 may be installed at an exit side of the cold storage evaporator 353 on the first branch passage 301.

The first evaporator 360 and the third expander 345 installed at an entrance side of the first evaporator 360 to expand the refrigerant may be provided at the second branch passage 302. The third expander 345 may include a capillary tube. The third expander 345 is referred to as a "first evaporation expander."

The first expander 341 and the cold storage evaporator 353 installed at an exit side of the first expander 341 to evaporate the refrigerant depressurized by the first expander 341 may be installed at the first branch passage 301. The first expander 341 may include a capillary tube.

The refrigerant flows through the first branch passage 301 and then is introduced into the cold storage evaporator 353, and the cold air may be stored in the PCM while the refrigerant is evaporated in the cold storage evaporator 353. The first expander 341 is referred to as a "second evaporation expander."

In order for the refrigerant evaporation pressure of the first evaporator 360 to be formed lower than that of the second evaporator 350, a diameter of the capillary tube of the third expander 345 may be smaller than that of the capillary tube of the first expander 341.

The third expander 345, the subsidiary condenser 323 which is installed at an entrance side of the third expander to condense the refrigerant, and the second expander 343 which is installed at an entrance side of the subsidiary condenser 323 to depressurize the refrigerant condensed by the condenser 320 may be installed at the second branch passage 302. The second expander 343 may include a capillary tube, and may be referred to as a "condensing expander," because the second expander 343 performs a depressurizing operation for a subsidiary condensing operation.

The cooling performance may be enhanced by depressurizing the refrigerant condensed in the condenser 320 and then condensing the refrigerant in the subsidiary condenser 323 (referring to FIG. 14).

The valve device 330 may be controlled so that the flow route of the refrigerant is changed according to an operation mode of the refrigerator. Here, the operation mode of the refrigerator may include a "simultaneous operation mode" in which the cooling operations of the refrigerating chamber and the freezing chamber are performed, a "refrigerating chamber operation mode" in which the cooling operation of the refrigerating chamber is performed, a "freezing chamber operation mode" in which the cooling operation of the freezing chamber is performed, and a "cold storage operation mode" in which the cold energy is stored in the cold storage part 370. The "cold storage operation mode" may be simultaneously performed with the "refrigerating chamber operation mode."

As an example, when the simultaneous operation mode is performed, the valve device 330 may be controlled so that the refrigerant is branched and supplied to the first and second branch passages 301 and 302. That is, the valve device 330 may be operated so that all of the two outlet ports are opened.

As another example, when the refrigerating chamber operation mode is performed, the refrigerant is supplied to the second evaporator 350. And the valve device 330 may be controlled so that the refrigerant is branched and supplied to the first branch passage 301. That is, the valve device 330 may be operated so that the first outlet port connected to the first branch passage 301 is opened.

When the first outlet port is opened, the refrigerant passes through the first branch passage 301, is depressurized by the first expander 341, flows to the cold storage evaporator 353 to be evaporated and thus to store the cold air in the cold storage material 372, and then flows to the second evaporator 350. Then, while the refrigerant is evaporated at the second evaporator 350, peripheral heat is absorbed to cool the air.

As still another example, when the freezing chamber operation mode is performed, the refrigerant is supplied to the first evaporator 360. And the valve device 330 may be controlled so that the second outlet port connected to the second branch passage 302 is opened.

When the second outlet port is opened, the refrigerant passes through the second branch passage 302, is depressurized by the second expander 343, flows to the subsidiary condenser 323 to be condensed, and then flows to the first evaporator 360. Then, while the refrigerant is evaporated at the first evaporator 360, the peripheral heat is absorbed to cool the air.

As yet another example, when the cold storage operation mode is performed, the flow of the refrigerant and the operation of the valve device 330 are the same as those in the refrigerating chamber operation mode, but as described later, there is a difference in only whether the evaporator fan is operated.

The above described operation mode may be performed based on whether to satisfy the internal temperature of the refrigerator 2, and a detailed method according to whether to satisfy the internal temperature may be described later with reference to FIG. 12.

Meanwhile, the refrigerator 2 may include blower fans 325, 355 and 365 which are respectively provided at one side of the heat exchanger to blow the air. The blower fans 325, 355, and 365 include a condenser fan 325 which is provided at one side of the condenser 320, a first evaporator fan 355 which is provided at one side of the second evaporator 350, and a second evaporator fan 365 which is provided at one side of the first evaporator 360.

Heat exchanging performance of the first and second evaporators 350 and 360 may be changed according to RPMs of the first and second evaporator fans 355 and 365. For example, when more cold air is required due to an operation of the second evaporator 350, the RPM of the first evaporator fan 355 may be increased, and when the cold air is sufficient, the RPM of the first evaporator fan 355 may be reduced.

FIG. 9 is a view illustrating a partial structure of the refrigerator according to another embodiment of the present disclosure, and FIG. 10 is a longitudinal cross-sectional view of the refrigerator according to another embodiment of the present disclosure.

Referring to FIGS. 9 and 10, the refrigerator 2 according to another embodiment of the present disclosure may include a machinery chamber 30 which is formed at a lower portion of the refrigerator 2, a first refrigeration chamber 31 which supplies the cold air to the refrigerating chamber 12, and a second refrigeration chamber 32 which supplies the cold air to the freezing chamber 13. The cold air of the first and second refrigeration chamber 31 and 32 may be discharged to the refrigerating chamber 12 and the freezing chamber 13 through the cold air discharging part 18.

The compressor 310 and the condenser 320 may be installed at the machinery chamber 30.

The first refrigeration chamber 31 may be provided at a rear wall of the refrigerating chamber 12, and may be formed between the refrigerating chamber inner case 16 and the refrigerating chamber cover plate 23. The second evaporator 350, the cold storage part 370, and the subsidiary condenser 323 and the cold storage evaporator 353 which are provided at an inside of the cold storage part 370 may be installed at the first refrigeration chamber 31.

The second evaporator 350 may be in contact with the refrigerating chamber cover plate 23, and may be fixed thereto by a holder (not shown).

The cold storage part 370 may be in contact with the refrigerating chamber inner case 16, and may be fixed thereto by a holder (not shown). The second evaporator 350 and the cold storage part 370 may be spaced from each other, as illustrated in the drawing. However, the second evaporator 350 may be in contact with the cold storage part 370.

A refrigerant pipe 350a of the second evaporator 350, a refrigerant pipe 353a of the cold storage evaporator 353 and a refrigerant pipe 323a of the subsidiary condenser 323 may be bent and extend vertically.

Since the refrigerant pipe 350a of the second evaporator 350, the refrigerant pipe 353a of the cold storage evaporator 353 and the refrigerant pipe 323a of the subsidiary condenser 323 are installed adjacent to each other, an installation space for the plurality of devices forming the refrigeration cycle may be reduced. Thus, a storage space of the storage chamber may be prevented from being reduced.

The second refrigeration chamber 32 may be provided at a rear wall of the freezing chamber 13, and may be formed between the freezing chamber inner case and the freezing chamber cover plate 24. The first evaporator 360 may be installed at the second refrigeration chamber 32.

A gas-liquid separator 180 which filters a liquid refrigerant out of the refrigerant evaporated by the first and second evaporators 350 and 360 and supplies a gas phase refrigerant to the compressors 310 may be provided at one side of each of the first and second evaporators 350 and 360.

FIG. 11 is a control block diagram of the refrigerator according to another embodiment of the present disclosure, and FIGS. 12 and 13 are flowcharts illustrating a method of controlling the refrigerator according to the embodiment of the present disclosure.

Referring to FIGS. 11 to 13, the refrigerator 2 according to the embodiment of the present disclosure may include a control part 50, an input part 41 which allows a user to input a desired temperature of the freezing chamber and a desired temperature of the refrigerating chamber, a refrigerating chamber temperature sensor 42 which detects a temperature of the refrigerating chamber 12, and a freezing chamber temperature sensor 43 which detects a temperature of the freezing chamber 13. The refrigerating chamber temperature sensor 42 and the freezing chamber temperature sensor 43 may be referred to as a "first temperature sensor" and a "second temperature sensor".

The control part 50 may control the compressor 310, the condenser fan 325, the first evaporator fan 355, the second evaporator fan 365 and the valve device 330 according to whether the temperatures detected by the temperature sensors 42 and 43 satisfy the desired temperatures.

A method of controlling the refrigerator 2 according to whether to satisfy the desired temperature of the refrigerating chamber 12 will be described with reference to FIG. 12.

The refrigerator is operated, and the desired temperature input by the user is received through the input part 41, and the temperature of the refrigerating chamber 12 is detected by the refrigerating chamber temperature sensor 42 (S11). A process of receiving the input of the desired temperature and a process of detecting the temperature may be performed in a different order.

By comparing the temperature detected by the refrigerating chamber temperature sensor 42 with the desired temperature, it is determined whether the temperature of the refrigerating chamber 12 satisfies the desired temperature (S12). The desired temperature may be temperature range information which does not have a lower limit. That is, the desired temperature information may be set so that the temperature of the refrigerating chamber 12 is maintained to be a certain temperature or less.

When the temperature of the refrigerating chamber 12 satisfies the desired temperature, the control part 50 controls the refrigeration cycle to be stopped (S13). Specifically, the control part 50 may control the compressor 310 and the first evaporator fan 355 to be stopped (S14).

As described above, when the refrigeration cycle is stopped, a cooling effect due to the refrigeration cycle does not occur, and the internal temperature of the refrigerator may be maintained in a certain level due to an indirect cooling effect by the cold storage part 370.

However, when the temperature of the refrigerating chamber 12 does not satisfy the desired temperature, the control part 50 controls the refrigerator 2 to be driven in the refrigerating chamber operation mode, and at the same time, a cold storage operation is also performed (S15). Specifically, the control part 50 may control the compressor 310 and the first evaporator fan 355 to be driven (S16). Also, the valve device 330 is controlled so that the first outlet port is opened and the second outlet port is closed (S17).

Therefore, the refrigerant may flow to the cold storage evaporator 353 and the second evaporator 350. Specifically, when the refrigerant depressurized by the first expander 341 is evaporated in the cold storage evaporator 353, the cold storage operation in which the cold air is stored in the cold storage material is performed, and when the refrigerant passing through the cold storage evaporator 353 is evaporated in the second evaporator 350, the refrigerating chamber operation mode in which the air flowing in the first refrigeration chamber 31 is cooled is performed.

When the control according to whether the temperature of the refrigerating chamber 12 satisfies the desired temperature is finished, another control according to whether the temperature of the freezing chamber 13 satisfies the desired temperature may be performed. A detained control method according to whether the temperature of the freezing chamber 13 satisfies the desired temperature will be described with reference to FIG. 13.

The refrigerator is operated, and the desired temperature input by the user is received through the input part 41, and the temperature of the freezing chamber 13 is detected by the freezing chamber temperature sensor 43 (S21). A process of receiving the input of the desired temperature and a process of detecting the temperature may be performed in a different order.

By comparing the temperature detected by the freezing chamber temperature sensor 43 with the desired temperature, it is determined whether the temperature of the freezing chamber 13 satisfies the desired temperature (S22). The desired temperature may be set so that the temperature of the freezing chamber 13 is maintained below a certain temperature.

When the temperature of the freezing chamber 13 satisfies the desired temperature, the control part 50 controls the refrigeration cycle to be stopped (S23). Specifically, the control part 50 may control the compressor 310 and the first evaporator fan 355 to be stopped (S24). Also, the valve device 330 may be controlled so that the first and second outlet ports are closed (S25).

However, when the temperature of the freezing chamber 13 does not satisfy the desired temperature, the control part 50 controls the refrigerator 2 to be driven in the freezing chamber operation mode (S26). Specifically, the control part 50 may control the compressor 310 and the second evaporator fan 365 to be driven (S27). Also, the valve device 330 is controlled so that the second outlet port is opened and the first outlet port is closed (S28).

Therefore, the refrigerant may flow to the subsidiary condenser 323 and the first evaporator 360. Specifically, the refrigerant depressurized by the second expander 343 is condensed in the subsidiary condenser 323, and the refrigerant passing through the subsidiary condenser 323 is depressurized again in the third expander 345 and then evaporated in the first evaporator 360, and thus the air flowing in the second refrigeration chamber 32 is cooled. In the subsidiary condenser 323, the refrigerant is condensed at a lower pressure than that in the condenser 320. Since a condensing and expanding process of the refrigerant is added, the cooling efficiency may be increased, and a detailed principle thereof will be described in FIG. 14.

A control process according to whether the temperature of the refrigerating chamber 12 satisfies the desired temperature, and a control process according to whether the temperature of the freezing chamber 13 satisfies the desired temperature may be performed in a different order, and the control processes may be performed at the same time. At this time, when both of the temperatures of the refrigerating chamber 12 and the freezing chamber 13 do not satisfy the desired temperatures, the simultaneous operation mode in which the refrigerant simultaneously flows to the first and second evaporators 350 and 360 may be performed. At this time, the flow of the refrigerant in each of the refrigerating chamber operation and the freezing chamber refrigeration operation quotes the description in the refrigerating chamber operation mode and the freezing chamber operation mode.

FIG. 14 is a graph illustrating a P-H diagram of the refrigerant circulated in the refrigerator according to another embodiment of the present disclosure.

Referring to FIG. 14, R is a diagram representing a refrigerant cycle in the refrigerating chamber operation mode, and F is a diagram representing a refrigerant cycle in the freezing chamber operation mode.

When the refrigerator 2 is in the "refrigerating chamber operation mode," the refrigeration cycle is circulated in order of A→B→C→D, and when the refrigerator 2 is in the "freezing chamber operation mode," the refrigeration cycle is circulated in order of A'→B'→C→D'→E→F.

In the case of the refrigerating chamber operation mode, an A-phase refrigerant inhaled into the compressor 310 is changed into a B-phase after compressed. And the refrigerant condensed by the condenser 320 has a C-phase.

Then, the refrigerant passing through the valve device 330 and depressurized by the first expander 341 has a D-phase, and the refrigerant evaporated in the cold storage evaporator 353 and the second evaporator 350 has an A-phase.

Meanwhile, in the case of the freezing chamber operation mode, an A'-phase refrigerant inhaled into the compressor 310 is changed into a B'-phase after compressed. And the refrigerant condensed by the condenser 320 has a C-phase.

And the C-phase refrigerant passes through the valve device 330 and is introduced into the second expander 343. The refrigerant introduced into and depressurized by the second expander 343 has a D'-phase.

The D'-phase refrigerant depressurized in the second expander 343 is introduced into the subsidiary condenser 323 and then condensed once more. The refrigerant introduced into and condensed by the subsidiary condenser 323 has an E-phase.

Then, the E-phase refrigerant condensed in the subsidiary condenser 323 is introduced into the third expander 345 and condensed once more. The refrigerant introduced into and depressurized by the third expander 345 has an F-phase.

The F-phase refrigerant depressurized in the first expander 341 is introduced into the first evaporator 360, and the refrigerant introduced into and evaporated by the first evaporator 360 has an A'-phase. According to such a refrigeration cycle, an evaporation capacity at the first evaporator 360 is h2-h1'.

In the subsidiary condenser 323, the refrigerant is condensed at a lower pressure than that in the condenser 320, and the second expander 343 serves to prevent the radiant value of the condenser 320 from being reduced due to the subsidiary condenser 323.

Meanwhile, in the refrigerating chamber operation mode, when the second expander 343 is not provided at the refrigeration cycle, the C-phase refrigerant condensed by the condenser 320 and the subsidiary condenser 323 is changed into a G-phase after depressurized by the third expander 345, and the G-phase refrigerant is changed into the A'-phase while being evaporated by the first evaporator 360. According to such a refrigeration cycle, the evaporation capacity at the first evaporator 360 is h2-h1.

Therefore, since the evaporation capacity, when the second expander 343 is provided at the refrigeration cycle, is h2-h1', and the evaporation capacity when the second expander 343 is not provided at the refrigeration cycle is h2-h1, the evaporation capacity in the case in which the second expander 343 is provided may be increased by Δh, compared to that in the case in which the second expander 343 is not provided.

Therefore, operation performance of the refrigerator may be improved, and a power consumption may be relatively reduced, compared with other refrigerators having the same operation performance. Eventually, operation efficiency of the refrigerator may be enhanced.

Hereinafter, a refrigerator according to still another embodiment will be described.

FIG. 15 is a view illustrating an internal structure of a refrigerator according to still another embodiment of the present disclosure.

In the refrigerator according to the embodiment, the description overlapped with the previous embodiment will be omitted. Also, elements having the same or similar functions will be given like reference numerals. The element having the same reference numeral can quote the description in the previous embodiment, except particular portions.

Referring to FIG. 15, the refrigerator 3 according to the embodiment of the present disclosure includes a main body 61 of which a front surface is opened, and a storage chamber which is formed at an inside of the main body 61. The storage chamber includes a freezing chamber 62 and a refrigerating chamber 63. The freezing chamber 62 and the refrigerating chamber 63 may be divided by a division part 64.

The main body 61 may include an outer case 65 which defines an exterior of the refrigerator 3, a freezing chamber inner case 66 which is disposed at an inside of the outer case 65 to form an inner surface of the freezing chamber 62, and a refrigerating chamber inner case 67 which is disposed at the inside the outer case 65 to form an inner surface of the refrigerating chamber 63. The freezing chamber inner case 66 and the refrigerating chamber inner case 67 may be commonly referred to as "inner cases".

Also, the refrigerator 3 may further include a freezing chamber door 71 and a refrigerating chamber door 72 which are rotatably coupled to a front side of the main body 61 to selectively open and close the freezing chamber 62 and the refrigerating chamber 63.

In the embodiment, a side-by-side type in which the freezing chamber and the refrigerating chamber are provided at left and right sides thereof will be described as an example. However, the spirit of the present disclosure may be applied to not only the above-described structure of the refrigerator, but also a top mount type in which the freezing chamber is formed at an upper portion thereof and the refrigerating chamber is formed at a lower portion thereof, or a bottom freezer type in which the freezing chamber is formed at a lower portion thereof and the refrigerating chamber is formed at an upper portion thereof.

The freezing chamber 62 may include a freezing chamber damper 82 through which air cooled by an evaporator 450 (referring to FIG. 16) which will be described later is discharged to the freezing chamber 62. The freezing chamber damper 82 may be provided at a rear surface of the freezing chamber 62, and may be formed at the freezing chamber cover plate 73. The evaporator 450 is disposed at a rear side of the freezing chamber cover plate 73.

A refrigerating chamber cover plate 74 having a cold air discharging part (not shown) through which cold air is discharged may be also provided at a rear surface of the refrigerating chamber 63.

FIG. 16 is a transverse cross-sectional view taken along a line I-I of FIG. 15, FIG. 17 is a longitudinal cross-sectional view taken along a line II-II of FIG. 15, and FIG. 18 is a view illustrating a refrigeration cycle structure of the refrigerator according to still another embodiment of the present disclosure.

Referring to FIGS. 16 to 18, the refrigerator 3 according to the embodiment of the present disclosure may include a refrigeration chamber 81 which is provided at an inside of the refrigerator 3, the evaporator 450 which is installed at the refrigeration chamber 81 to evaporate a refrigerant, a refrigerating chamber damper 69 which controls a flow of the air cooled by the evaporator 450 in the refrigerating chamber 63, the freezing chamber damper 82 which controls a flow of the air cooled by the evaporator 450 in the freezing chamber 62, and a cold storage part 460 which is installed between the refrigerating chamber inner case 67 and the refrigerating chamber cover plate 74. The cold storage part 460 may be fixed to the refrigerating chamber cover plate 74 by a holder (not shown), but is not limited thereto.

The refrigerating chamber damper 69 may be installed at the division part 64 which divides the freezing chamber 62 and the refrigerating chamber 63. When the refrigerating chamber damper 69 is opened, the cold air in the refrigeration chamber 81 may be introduced into the refrigerating chamber 63 through the refrigerating chamber damper 69.

It may be understood that the cold storage part 460 is an indirect cooling unit for cooling the refrigerating chamber 63. Specifically, the cold storage part 460 includes a case 461 which defines a storage space, and a cold storage material 462 which is stored at an inside of the case 461.

The cold storage material 462 may include a phase change material (PCM) of which a phase is changed at a low temperature to perform a cooling operation. For example, the PCM may include water or carbon dioxide.

When the PCM is used as the cold storage material, high density cold air may be stored through an inflow and outflow of a large quantity of cold air during a phase changing process, while a predetermined target temperature is maintained. Also, since a setting temperature may be maintained for a long period of time without external power supply, it is possible to contribute to energy conservation.

A cold storage evaporator 451 which evaporates the refrigerant to store cold air in the cold storage material 462, and a subsidiary condenser 421 in which the refrigerant is condensed by the cold storage material 462 may be installed at an inside of the case 461 of the cold storage part 460.

A refrigerant pipe 451a of the cold storage evaporator 451 may be bent and extend vertically. And a refrigerant pipe 421a of the subsidiary condenser 421 may be bent and extend vertically.

Since the refrigerant pipe 451a of the cold storage evaporator 451, the refrigerant pipe 421a of the subsidiary condenser 421 are vertically installed adjacent to each other, an installation space for the cold storage evaporator 451 and the subsidiary condenser 421 may be reduced. Thus, a storage space of the storage chamber may be prevented from being reduced.

A machinery chamber 80 may be formed at the lower portion of the refrigerator 3. A compressor 410 which compresses the refrigerant evaporated in the evaporator 450 and a condenser 420 which condenses the refrigerant compressed in the compressor 410 may be included at an inside of the machinery chamber 80.

The refrigerator 3 includes a refrigerant pipe 400 which connects the compressor 410 and the condenser 420 so as to guide the flow of the refrigerant.

The refrigerator 3 includes first and second branch passages 401 and 402 which branch the refrigerant passing through the condenser 420. The refrigerator 3 includes a valve device 430 which is installed at the refrigerant pipe 400 to branch the refrigerant into the first and second branch passages 401 or 402. The valve device 430 may include a three-way valve having one inlet port through which the refrigerant is introduced, and two outlet ports through which the refrigerant is discharged. The one inlet port is connected to the refrigerant pipe 400, and a first outlet port of the two outlet ports is connected to the first branch passage 401, and a second outlet port is connected to the second branch passage 402. At least one of the first and second outlet ports may be opened according to a control operation of the valve device 330, and thus a flow route of the refrigerant may be changed.

The cold storage evaporator 451 which evaporates the refrigerant and the first and a first expander 441 which is installed at an entrance side of the cold storage evaporator 451 may be installed at the first branch passage 401. The first expander 441 may include a capillary tube.

When the refrigerant condensed by the condenser 420 flows through the first branch passage 401 and then is introduced into the cold storage evaporator 451, the cold energy may be stored in the PCM while the refrigerant is evaporated in the cold storage evaporator 451. The first expander 441 is referred to as a "cold storage expander."

The subsidiary condenser 421 which condenses the refrigerant and the second expander 442 which is installed at an entrance side of the subsidiary condenser 421 to depressurize the refrigerant may be installed at the second branch passage 402. The second expander 442 may include a capillary tube, and may be referred to as a "condensing expander", because the second expander 343 performs a depressurizing operation for a subsidiary condensing operation.

When the refrigerant condensed in the condenser 420 flows through the second branch passage 402, and is then introduced into the subsidiary condenser 421, the cooling performance may be enhanced by depressurizing the refrigerant condensed in the condenser 420 and then condensing the refrigerant in the subsidiary condenser 421 (referring to FIG. 19).

The evaporator 450 which is installed at the entrance side of the subsidiary condenser 421 and a third expander 443 which is installed at an entrance side of the evaporator 450 may be installed at the second branch passage 402. The third expander 443 may include a capillary tube. The third expander 443 is referred to as an "evaporation expander".

A control operation of the valve device 430 may be performed based on whether an internal temperature of the refrigerator 3 satisfies the desired temperature.

When the internal temperature of the refrigerator 3 satisfies the desired temperature, the refrigerator 3 is controlled to perform a "low cold energy operation" in which cold air is stored in the cold storage material 462. Specifically, the valve device 430 is controlled so that the first outlet port is opened and thus the refrigerant flows to the cold storage evaporator 451 through the first branch passage 401. At this time, the second outlet port may be closed.

However, when the internal temperature of the refrigerator 3 does not satisfy the desired temperature, the refrigerator 3 is controlled to perform a "high cold energy operation." Specifically, the valve device 430 is controlled so that the second outlet port is opened and thus the refrigerant flows to the second branch passage 402. At this time, the first outlet port may be closed.

A detailed control method in the high cold air operation or the low cold air operation will be described in FIG. 21.

The refrigerant evaporated in the evaporator 450 is introduced into the compressor 410, and a check valve 470 which prevent a back flow of the refrigerant may be installed at the refrigerant pipe 400 between the evaporator 450 and the compressor 410.

The refrigerator 3 may further include blower fans 425 and 455 which are provided at one side of the condenser 420 or the evaporator 450 to blow the air. The blower fans 425 and 455 includes a condenser fan 425 which is provided at one side of the condenser 420, and an evaporator fan 455 which is provided at one side of the evaporator 450.

Heat exchanging performance of the evaporator 450 may be changed according to an RPM of the evaporator fan 455. For example, when more cold air is required due to an operation of the evaporator 450, the RPM of the evaporator fan 455 may be increased, and when the cold air is sufficient, the RPM of the evaporator fan 455 may be reduced.

FIG. 19 is a graph illustrating a P-H diagram of a refrigerant circulated in the refrigerator according to still another embodiment of the present disclosure.

Referring to FIGS. 18 and 19, when the refrigerator according to the embodiment of the present disclosure performs the "low cold air operation," the refrigeration cycle is circulated in order of A→B→C→D. At this time, it is assumed that performance of the cold storage evaporator 451 is the same as that of the evaporator 450, and performance of the first expander 441 is the same as that of the third expander 443. Therefore, it may be understood that the two cycles are different from each other in whether the second expander 442 and the subsidiary condenser 421 are installed.

Specifically, an A-phase refrigerant introduced into the compressor 410 is changed into a B-phase after compressed. And the refrigerant condensed by the condenser 420 has a C-phase.

Then, the refrigerant passing through the valve device 430 and depressurized by the first expander 441 has a D-phase, and the refrigerant depressurized by the first expander 441 is introduced into the cold storage evaporator 451, and the refrigerant evaporated by the cold storage evaporator 451 has an A-phase.

According to such as refrigeration cycle, an evaporation capacity at the cold storage evaporator 450 is h2-h1. This is a result when it is assumed that the performance of the cold storage evaporator 451 is the same as that of the evaporator 450.

However, when the first expander 441 is provided at the refrigeration cycle, i.e., the "high cold energy operation" is performed, the refrigeration cycle is circulated in order of A→B→C→D'→E→F.

Specifically, an A-phase refrigerant introduced into the compressor 410 is changed into a B-phase after compressed. And the B-phase refrigerant is introduced into and condensed by the first condenser 120, and then changed into a C-phase.

Then, the C-phase refrigerant passes through the valve device 430 and is introduced into the second expander 442. The refrigerant introduced into and depressurized by the second expander 442 has a D'-phase.

The D'-phase refrigerant depressurized by the second expander 442 is introduced into the subsidiary condenser 421, and then condensed once more. The refrigerant introduced into and condensed by the subsidiary condenser 421 has an E-phase.

Then, the refrigerant condensed by the subsidiary condenser 421 is introduced into the first expander 441, and depressurized once more. The refrigerant introduced into the third expander 443 and depressurized has an F-phase.

The F-phase refrigerant depressurized by the third expander 443 is introduced into the evaporator 450, and the refrigerant introduced into and evaporated by the evaporator 450 has an A-phase.

In the subsidiary condenser 421, the refrigerant is condensed at a lower pressure than that in the condenser 420, and the second expander 442 serves to prevent the radiant value of the condenser 420 from being reduced due to the subsidiary condenser 421.

According to such as refrigeration cycle, an evaporation capacity at the evaporator 450 is h2-h1'.

It can be understood that h2-h1' which is the evaporation capacity at the evaporator 450 is larger than h2-h1 which is the evaporation capacity at the cold storage evaporator 451 by Δh due to the depressurizing operation of the refrigerant in the second expander 442. Since this is a result when it is assumed that the performance of the cold storage evaporator 451 is the same as that of the evaporator 450, and the performance of the first expander 441 is the same as that of the third expander 443, it may be understood that the evaporation capacity is increased by adding the second expander 442 to the refrigeration cycle, and the cooling efficiency is also increased.

Therefore, operation performance of the refrigerator may be improved, and a power consumption may be relatively reduced, compared with other refrigerators having the same operation performance. Eventually, operation efficiency of the refrigerator may be enhanced.

FIG. 20 is a control block diagram of the refrigerator according to still another embodiment of the present disclosure.

Referring to FIG. 20, the refrigerator 3 according to the embodiment of the present disclosure may include a control part 50, an input part 41 which allows a user to input a desired temperature of the freezing chamber and a desired temperature of the refrigerating chamber, a freezing chamber temperature sensor 43 which detects a temperature of the freezing chamber 62, and a refrigerating chamber temperature sensor 42 which detects a temperature of the refrigerating chamber 63. The freezing chamber temperature sensor 43 and the refrigerating chamber temperature sensor 42 may be commonly called "temperature sensors".

The control part 50 may control the compressor 410, the condenser fan 425, the valve device 430, the evaporator fan 455, the freezing chamber damper 82 and the refrigerating chamber damper 69 according to whether the temperatures detected by the temperature sensors 42 and 43 satisfy the desired temperatures.

The control part 50 may primarily control the freezing chamber damper 82 and the refrigerating chamber damper 69 according to whether the temperatures detected by the temperature sensors 42 and 43 satisfy the desired temperatures, and thus may control the internal temperature of the refrigerator.

Specifically, when the temperature detected by the freezing chamber temperature sensor 43 does not satisfy the desired temperatures, the control part 50 may control the freezing chamber damper 82 to be maximally opened, and thus the cold air is introduced into the freezing chamber 62. When the temperature detected by the freezing chamber temperature sensor 43 satisfies the desired temperatures, the control part 50 may control the freezing chamber damper 82 so that the cold air is not introduced into the freezing chamber 62.

Also, when the temperature detected by the refrigerating chamber temperature sensor 42 does not satisfy the desired temperatures, the control part 50 may control the refrigerating chamber damper 60 to be maximally opened, and thus the cold air is introduced into the refrigerating chamber 63. When the temperature detected by the refrigerating chamber temperature sensor 42 satisfies the desired temperatures, the control part 50 may control the refrigerating chamber damper 69 so that the cold air is not introduced into the refrigerating chamber 63.

Meanwhile, when the temperatures detected by the temperature sensors 42 and 43 do not satisfy the desired temperatures even though the dampers 82 and 69 are controlled, the control part 50 may control the compressor 410, the condenser fan 425, the valve device 430 and the evaporator fan 455, and thus may control the refrigeration cycle to perform the high cold energy operation or the low cold energy operation. A detailed control method thereof will be described in FIG. 21.

FIG. 21 is a flowchart illustrating a method of controlling the refrigerator according to still another embodiment of the present disclosure. The method of controlling the refrigerator according to still another embodiment of the present disclosure will be described with reference to FIG. 21.

When an operation the refrigerator 3 is started, the control part 50 drives the compressor 410, and thus the refrigeration cycle is circulated (S31).

Then, the desired temperatures of the refrigerating chamber and the freezing chamber are input and received through the input part 41 by the user (S32), and the internal temperature of the refrigerator is detected using the freezing chamber temperature sensor 43 or the refrigerating chamber temperature sensor 42 (S33).

When the internal temperature of the refrigerator is detected by the sensor, the control part 50 determines whether the internal temperature of the refrigerator satisfies the desired temperature (S34).

When the internal temperature of the refrigerator satisfies the desired temperature, i.e., the temperature of the refrigerating chamber or the freezing chamber satisfies the desired temperature, the control part 50 controls the refrigeration cycle to perform the cold storage operation (low cold energy operation) (S35).

Specifically, the control part 50 controls the evaporator fan 455 to be stopped (S36), and controls the valve device 430 so that the first outlet port is opened and the second outlet port is closed (S37).

When the internal temperature of the refrigerator does not satisfy the desired temperature, the control part 50 controls the refrigeration cycle to perform the high cold air operation, and thus cools an inside of the refrigerator (S38). The case in which the internal temperature of the refrigerator does not satisfy the desired temperature is a case in which the temperature of the freezing chamber 62 does not satisfy the desired temperature. When the temperature of the freezing chamber 62 satisfies the desired temperature, but the temperature of the refrigerating chamber 63 does not satisfy the desired temperature, the refrigerating chamber damper 69 is controlled to be opened, such that the cold air in the refrigeration chamber 81 is introduced into the refrigerating chamber 63.

Specifically, the evaporator fan 455 is controlled to be driven (S39), and the valve device 430 is controlled so that the second outlet port is opened and the first outlet port is closed (S40). Sequentially, the internal temperature of the refrigerator 3 may be detected, and then it is determined whether to satisfy the desired temperature.

According to the embodiment proposed in the present disclosure, the radiant value of the condenser can be prevented from being lowered due to the subsidiary condenser, and thus the cooling efficiency of the refrigeration cycle can be increased.

Also, since the phase change material (PCM) is used as the cold storage material, the heat exchanging efficiency of the heat exchanger can be enhanced, and the internal temperature of the refrigerator can be constantly maintained.

Also, since a separate device for increasing the cooling efficiency, except the additional expander, is not provided, an internal design of the refrigerator is simple, and the space of the storage chamber can be effectively used.

Also, since the present disclosure has a simple cycle structure, the manufacturing cost thereof can be reduced.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A refrigerator comprising:
   a main body having a storage chamber; and
   a refrigeration cycle located in the main body and configured to supply cold air into the storage chamber,
   wherein the refrigeration cycle includes:
      a compressor configured to compress a refrigerant;
      a condenser configured to condense the refrigerant compressed by the compressor;
      a refrigerant pipe that extends from an outlet of the condenser;
      a valve device that has one inlet port and two outlet ports, the inlet port of the valve device being connected to an end of the refrigerant pipe;
      a first branch passage branched from one of the two outlet ports of the valve device;
      a second branch passage branched from the other of the two outlet ports of the valve device;
      a cold storage expander located at the first branch passage and configured to depressurize the refrigerant condensed by the condenser;
      a cold storage evaporator located at an outlet side of the cold storage expander and configured to evaporate the refrigerant depressurized by the cold storage expander;
      a subsidiary condenser located at the second branch passage;
      a condensing expander located at the second branch passage and between the subsidiary condenser and the valve device, wherein the subsidiary condenser is configured to condense the refrigerant depressurized by the condensing expander;
      an evaporation expander located at an outlet side of the subsidiary condenser and configured to depressurize the refrigerant condensed by the condenser; and
      a first evaporator configured to evaporate the refrigerant depressurized by the evaporation expander and thus to cool the storage chamber.

2. The refrigerator according to claim 1, further comprising a cold storage part having a phase change material (PCM) therein and in which the subsidiary condenser and the cold storage evaporator are installed,
   wherein the cold storage part exchanges heat with each of the subsidiary condenser and the cold storage evaporator.

3. The refrigerator according to claim 2, further comprising a second evaporator installed at an exit side of the cold storage evaporator to evaporate again the refrigerant evaporated by the cold storage evaporator.

4. The refrigerator according to claim 1, further comprising an input part configured to receive an input of a desired temperature of the storage chamber, and a temperature sensor provided at an inside of the storage chamber,
   wherein, when a temperature detected by the temperature sensor satisfies the desired temperature, the first outlet port is opened and the second outlet port is closed by the valve device and thus the refrigerant is guided to flow to the cold storage evaporator.

5. The refrigerator according to claim 4, wherein, when the temperature detected by the temperature sensor does not satisfy the desired temperature, the second outlet port is opened and the first outlet port is closed by the valve device and thus the refrigerant is guided to flow to the first evaporator.

6. The refrigerator according to claim 1, further comprising a check valve located between the first evaporator and the compressor and configured to guide a one-way flow of the refrigerant toward the compressor.

7. The refrigerator according to claim 1, wherein the storage chamber comprises a refrigerating chamber and a freezing chamber, and the first evaporator is installed at a rear wall of the freezing chamber, and the cold storage evaporator and the subsidiary condenser are installed at a rear wall of the refrigerating chamber.

8. A control method of operating a refrigerator comprising a main body that has a storage chamber, the control method comprising:
   supplying, by a refrigeration cycle located in the main body, cold air into the storage chamber, wherein the refrigeration cycle includes:
      a compressor configured to compress a refrigerant;
      a condenser configured to condense the refrigerant compressed by the compressor;
      a refrigerant pipe that extends from an outlet of the condenser;
      a valve device that has one inlet port and two outlet ports, the inlet port of the valve device being connected to an end of the refrigerant pipe;
      a first branch passage branched from one of the two outlet ports of the valve device;
      a second branch passage branched from the other of the two outlet ports of the valve device;
      a cold storage expander located at the first branch passage and configured to depressurize the refrigerant condensed by the condenser;
      a cold storage evaporator located at an outlet side of the cold storage expander and configured to evaporate the refrigerant depressurized by the cold storage expander;
      a subsidiary condenser located at the second branch passage;
      a condensing expander located at the second branch passage and between the subsidiary condenser and the valve device, wherein the subsidiary condenser is configured to condense the refrigerant depressurized by the condensing expander;
      an evaporation expander located at an outlet side of the subsidiary condenser and configured to depressurize the refrigerant condensed by the condenser; and
      a first evaporator configured to evaporate the refrigerant depressurized by the evaporation expander and thus to cool the storage chamber.

9. The control method according to claim 8, further comprising exchanging, by a cold storage part that has a phase change material (PCM) therein and at which the subsidiary condenser and the cold storage evaporator are located, heat with each of the subsidiary condenser and the cold storage evaporator.

10. The control method according to claim 9, further comprising evaporating, by a second evaporator located at an exit side of the cold storage evaporator, the refrigerant evaporated by the cold storage evaporator.

11. The control method according to claim 8, further comprising guiding, by a check valve located between the first evaporator and the compressor, a one-way flow of the refrigerant toward the compressor.

12. The control method according to claim 8, wherein the storage chamber comprises a refrigerating chamber and a freezing chamber, and the first evaporator is located at a rear wall of the freezing chamber, and the cold storage evaporator and the subsidiary condenser are located at a rear wall of the refrigerating chamber.

* * * * *